US012776213B2

(12) United States Patent
Ucar et al.

(10) Patent No.: US 12,776,213 B2
(45) Date of Patent: Oct. 27, 2026

(54) SEVERITY AWARE ADVERSE DRIVING NOTIFICATION

(71) Applicants: Toyota Jidosha Kabushiki Kaisha, Toyota (JP); Toyota Motor Engineering & Manufacturing North America, Inc., Plano, TX (US)

(72) Inventors: Seyhan Ucar, Mountain View, CA (US); Sachin Sharma, Mountain View, CA (US); Yongkang Liu, Mountain View, CA (US); Kentaro Oguchi, Mountain View, CA (US)

( * ) Notice: Subject to any disclaimer, the term of this patent is extended or adjusted under 35 U.S.C. 154(b) by 382 days.

(21) Appl. No.: 18/208,850

(22) Filed: Jun. 12, 2023

(65) Prior Publication Data

US 2024/0412631 A1 Dec. 12, 2024

(51) Int. Cl.
*G08G 1/0967* (2006.01)

(52) U.S. Cl.
CPC .............................. *G08G 1/096791* (2013.01)

(58) Field of Classification Search
CPC ................................................ G08G 1/096791
See application file for complete search history.

(56) References Cited

U.S. PATENT DOCUMENTS 9,113,786 B2 8/2015 Li
9,122,933 B2 9/2015 Palan
9,881,498 B2 * 1/2018 Paromtchik ........... B60W 50/12
10,037,699 B1 7/2018 Toyoda et al.
10,089,876 B1 10/2018 Ramasamy et al.
(Continued)

FOREIGN PATENT DOCUMENTS

JP 2015219631 A 12/2015
SE 539157 C2 * 4/2017 ........... G08G 1/0104
(Continued)

OTHER PUBLICATIONS

Wang, Jianqiang et al., "A forward collision warning algorithm with adaption to driver behaviors," IEEE Transactions on Intelligent Transportation Systems 17, No. 4, Dec. 4, 2015, pp. 1157-1167.
(Continued)

*Primary Examiner* — Davetta W Goins
(74) *Attorney, Agent, or Firm* — Burbage Law, P.C.; Jon-Michael Burbage

(57) ABSTRACT

The disclosure includes embodiments for decreasing false positive notifications of abnormal driving behavior to a driver of an ego vehicle. The method includes detecting, based one or more first sensor measurements recorded by a sensor set of an ego vehicle, a presence of an adverse driving condition caused by a remote vehicle. The method includes determining a first severity of the adverse driving condition based on the one or more first sensor measurements. The method includes determining a second severity of the adverse driving condition based at least in part on one or more second sensor measurements. The method includes providing, by the ego vehicle, a notification of the adverse driving condition caused by the remote vehicle responsive to the second severity increasing relative to the first severity so that an increasing severity trend is present wherein the notification is not provided if the increasing severity trend is not present.

20 Claims, 9 Drawing Sheets

(56) References Cited

U.S. PATENT DOCUMENTS

| | | | | |
|---|---|---|---|---|
| 10,296,794 | B2 * | 5/2019 | Ratti | G06F 15/76 |
| 10,558,224 | B1 * | 2/2020 | Lin | G05D 1/0088 |
| 10,595,175 | B2 * | 3/2020 | Ramalho de Oliveira | G08G 1/0112 |
| 10,762,785 | B1 | 9/2020 | Dewey et al. | |
| 10,864,911 | B2 | 12/2020 | Jurca et al. | |
| 10,967,862 | B2 * | 4/2021 | Bonk | G05D 1/0027 |
| 11,380,198 | B2 | 7/2022 | Ucar et al. | |
| 11,414,088 | B2 | 8/2022 | Ucar et al. | |
| 11,565,693 | B2 * | 1/2023 | Tahmasbi-Sarvestani | G08G 1/167 |
| 12,134,379 | B2 * | 11/2024 | Oboril | B60W 50/0097 |
| 2018/0144636 | A1 | 5/2018 | Becker | |
| 2019/0051159 | A1 | 2/2019 | Wang et al. | |
| 2020/0111355 | A1 | 4/2020 | Alcazar et al. | |
| 2020/0307589 | A1 | 10/2020 | Li et al. | |
| 2021/0211851 | A1 | 7/2021 | Higuchi et al. | |
| 2021/0319692 | A1 | 10/2021 | Ucar et al. | |
| 2022/0068122 | A1 | 3/2022 | Ucar et al. | |
| 2022/0080977 | A1 * | 3/2022 | Ucar | B60W 40/09 |
| 2023/0052137 | A1 | 2/2023 | Choi et al. | |

FOREIGN PATENT DOCUMENTS

| | | | | |
|---|---|---|---|---|
| WO | 2018042003 | A1 | 3/2018 | |
| WO | WO-2020073003 | A1 * | 4/2020 | B60L 58/13 |

OTHER PUBLICATIONS

Liu, Zhenyu et al., "SenSafe: A smartphone-based traffic safety framework by sensing vehicle and pedestrian behaviors," Mobile Information Systems 2016, Sep. 2016, 13 pages.

Madrid, Frank et al., "Matrix profile xx: Finding and visualizing time series motifs of all lengths using the matrix profile," 2019 IEEE International Conference on Big Knowledge (ICBK), IEEE, 2019, 10 pages.

Toghil, Behrad et al., "Altruistic Maneuver Planning for Cooperative Autonomous Vehicles Using Multi-agent Advantage Actor-Critic," 2021 IEEE/CVF Conference on Computer Vision and Pattern Recognition (CVPR), Jul. 2021, 8 pages.

Wang, Hao M. et al., "Opportunistic Strategy for Cooperative Maneuvering Using Conflict Analysis," 2021 IEEE Intelligent Vehicles Symposium (IV), Jul. 2021, pp. 348-353.

Schwarting, Wilko et al., "Social behavior for autonomous vehicles," Articles in Psychological and Cognitive Sciences, PNAS vol. 116, No. 50, Nov. 22, 2019, 7 pages.

Hagenauer, Florian et al., "Vehicular micro cloud in action: on gateway selection and gateway handovers," Journal of Ad Hoc Networks, vol. 78, Sep. 2018, pp. 73-83.

Liu, Hao et al., "Fine-tuning ADAS algorithm parameters for optimizing traffic safety and mobility in connected vehicle environment," Journal of Transportation Research Part C: Emerging Technologies, vol. 76, Mar. 2017, pp. 132-149.

Higuchi, Takamasa et al., "On the feasibility of vehicular micro clouds," 2017 IEEE Vehicular Networking Conference (VNC), IEEE, 2017, 4 pages.

Uno, Nobuhiro et al., "A microscopic analysis of traffic conflict caused by lane-changing vehicle at weaving section," Proceedings of the 13th mini-EURO conference-handling uncertainty in the analysis of traffic and transportation systems, Bari, Italy, 2002, 6 pages.

* cited by examiner

800

$$W = \frac{\sum_{i=1}^{n} w_i X_i}{\sum_{i=1}^{n} w_i}$$

$W$ = Computed severity score $n$ = Number of terms evaluated $w_i$ = Weights applied to each terms $X_i$ = Characteristics of unsafe driving and surrounding First Severity Equation 805

$$W = X + Y + Z$$

$W$ = Computed Severity Score (as described by analysis data 181)

$X$ = Severity caused by Characteristics of Unsafe Driving (as accounted for by moment pattern data 161)

$Y$ = Severity caused by Characteristics of the Ego Vehicle (as accounted for by sensor data describing the ego vehicle)

$Z$ = Severity cased by Characteristifcs of Surrounding (as accounted for by environment data 163)

Second Severity Equation 810

Figure 8

SEVERITY AWARE ADVERSE DRIVING NOTIFICATION

BACKGROUND

The specification relates to providing a severity aware adverse driving notification.

Modern vehicles broadcast vehicle-to-everything (V2X) messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, which are operable to control the operation of some or all of the systems of a vehicle.

A particular vehicle that includes these vehicle applications is referred to as herein as an "ego vehicle" and other vehicles in the vicinity of the ego vehicle are referred to as "remote vehicles."

SUMMARY

An ego vehicle includes a sensor set including a plurality of sensors. At least one of the sensors is executed by one or more processors of the ego vehicle to measure sensor measurements about the proximate environment of the ego vehicle. The proximate environment is the portion of the environment surrounding the ego vehicle that is measurable by the sensors included in the sensor set. In some embodiments, the proximate environment is the environment that is within sensor range of one or more sensors included in the sensor set. Sensor range is the range that is measurable by the sensors included in the sensor set. In some embodiments, the proximate environment includes the interior cabin of the ego vehicle itself. Sensor data includes digital data that describes the sensor measurements recorded by the sensor set.

An ego vehicle includes one or more vehicle control systems (or some other onboard system), at least one of which analyzes the sensor data to identify a presence of an adverse driving condition within the proximate environment. The vehicle control system analyzes the sensor data and identifies a presence of an adverse driving condition within the proximate environment. An adverse driving condition is a circumstance where the ego vehicle is operating on the roadway with a remote vehicle that is within sensor range of the ego vehicle and exhibiting a behavior that is associated with unsafe driving behavior.

The following paragraphs include examples for how a notification system described herein identifies adverse driving conditions according to some embodiments. Other examples are possible.

As a first example of identifying adverse driving conditions, an artificial intelligence (AI) model is executed using historical traffic data to identify patterns of driving behavior that result in traffic accidents or near-misses, or otherwise satisfy a threshold for unsafe driving behavior. In some embodiments, the historical traffic data includes digital data that describes real-life traffic information recorded by one or more government agencies (e.g., United States Department of Transportation) or automobiles themselves (e.g., vehicles that include sensor sets similar to the ego vehicle). In some embodiments, the historical traffic data describes examples of safe driving and unsafe driving. As described below, in some embodiments the historical traffic data other types of examples or is used for other purposes. The output of this process is pattern data that describes patterns of driving that are correlated or consistent with unsafe driving as determined by the AI model. In some embodiments, the notification system analyzes the pattern data and the sensor data (including perhaps other digital data received via a vehicular micro cloud) to identify patterns of driving within the proximate environment of the ego vehicle, as described by the sensor data, that are correlated or consistent with unsafe driving, as shown by the pattern data. As described below, in some embodiments the pattern data describes other types of patterns and is used for other purposes.

In some embodiments, the AI model includes a transformer-based AI model. In some embodiments, the AI model includes a deep learning AI model. In some embodiments, the AI model includes a convolutional neural network. Other examples of AI models are possible.

Unsafe driving is driving that satisfies a threshold for unsafety. Examples of unsafe driving include, but are not limited to, one or more of the following: aggressive driving (e.g., tailgating, cutting in a lane, etc.); distracted driving (e.g., swerving, delayed reaction, etc.); reckless driving (e.g., green light running, lane change without signaling, turning without signaling, delayed use of a turning signal when turning or changing lanes). Other examples are possible.

As a second example of identifying adverse driving conditions, a digital twin simulation is executed by a processor using historical driving data and, optionally, the sensor data recorded by the ego vehicle itself and (optionally) other vehicles on the roadway (e.g., via members of a vehicular micro cloud that provide their own digital data to the ego vehicle). The digital twin simulation outputs pattern data. As used in this paragraph, pattern data describes patterns of driving that are correlated or consistent with unsafe driving as determined by the digital twin simulation. Accordingly, pattern data includes digital data that describes patterns of driving that are correlated or consistent with unsafe driving regardless how the patterns are identified. In some embodiments, the notification system compares the pattern data to the sensor data to identify patterns of driving within the proximate environment of the ego vehicle, as described by the sensor data, that are correlated or consistent with unsafe driving, as shown by the digital twin simulations.

As a third example of identifying adverse driving conditions, the notification system described herein analyzes the historical traffic data and the sensor data (including perhaps other digital data received via a vehicular micro cloud) to identify patterns of driving within the proximate environment of the ego vehicle, as described by the sensor data, that are correlated or consistent with unsafe driving, as shown within the historical traffic data.

As a fourth example of identifying adverse driving conditions, the notification system described herein analyzes the historical traffic data and the sensor data (including perhaps other digital data received via a vehicular micro cloud) using mathematical models to identify patterns of driving within the proximate environment of the ego vehicle, as described by the sensor data, that are correlated or consistent with unsafe driving, as shown by inputting the historical traffic data into one or more mathematical models in order to generate pattern data using the one or more mathematical models.

Responsive to identifying the adverse driving condition, the vehicle control system notifies the driver of the ego vehicle about the presence of the adverse driving condition. For example, the vehicle control system causes a speaker in the ego vehicle to provide an audio notification to the driver of the ego vehicle about the presence of the adverse driving condition. In another example, the vehicle control system causes an electronic display of the ego vehicle to provide a visual notification to the driver of the ego vehicle about the presence of the adverse driving condition. In yet another example, the vehicle control system causes a haptic motor of the ego vehicle to provide a haptic feedback to the driver about the presence of the adverse driving condition. In still another embodiment, the vehicle control system provides one or more of the following types of feedback to the driver of the ego vehicle: an audio notification; a visual notification; and haptic feedback.

A problem is that sometimes false positive notifications occur. A false positive notification includes a situation where the vehicle control system notifies the driver about the presence of the adverse driving condition and the driver did not want to receive the notification. In some embodiments, the driver does not want to receive the notification because the adverse driving condition does not satisfy a threshold for unsafety. In some embodiments, the driver does not want the notification for this particular type of adverse driving condition. In some embodiments, the driver does not want the notification for the adverse driving condition because their personal sense of what constitutes an adverse driving condition differs from the programming of the notification system. For example, the driver has a lower level of sensitivity and does not want to be notified about adverse driving conditions that pose this degree of risk or less. Other conditions are possible. Regardless, a false positive notification includes any situation where the vehicle control system notifies the driver about the presence of the adverse driving condition and the driver did not want to receive the notification.

False positive notifications are undesirable because research shows that they cause drivers to turn off vehicle control systems or ignore their notifications. As a result, the frequency of collisions or other unsafe conditions are increased. Accordingly, reducing false positive notifications would beneficially improve the performance of vehicle control systems and increase roadway safety.

The notification system described herein beneficially solves the problem described above by analyzing the severity of an identified adverse driving condition over time (e.g., $t_1 \ldots t_n$ where "n" is any positive whole number) to identify an increasing trend in severity. In some embodiments, the notification system only notifies the driver of the ego vehicle about the presence of the adverse driving condition if an increasing trend in severity is observed by the notification system over time. If an increasing trend in severity is not observed by the notification system, then the notification system does not notify the driver about the presence of the adverse driving condition. Laboratory and field tests have shown that this approach beneficially reduces false positive notifications. Over time minimizes false positive notifications are minimized. As a result, drivers take the notifications they receive more seriously and act to avoid or respond to the adverse driving condition without first feeling the need to verify that the notification is accurate. The field tests showed that this tremendously increased overall safety and driver satisfaction with the performance of their vehicle's vehicle control systems.

Another problem is that different drivers disagree about what types of adverse driving conditions merit receiving a notification. This is yet another source of false positive notifications. The notification system described herein solves this problem by providing drivers with an interface they use to provide feedback responsive to receiving a notification about an adverse driving condition. In some embodiments, if the driver disagrees with a notification, they are able to use an interface to provide feedback about why they disagree (e.g., they do not want to be notified about this particular type of adverse driving condition or they do not think the adverse driving condition was severe enough to merit being disturbed by the notification).

Feedback data includes digital data that describes the feedback. In some embodiments, the feedback indicates the driver's agreement or disagreement with being notified about the adverse driving condition.

In some embodiments, the notification system beneficially uses this feedback to adjust weights included in the severity equation. In some embodiments, the notification system beneficially uses this feedback to select a different severity equation for determining the severity of the adverse driving conditions. In this way the notification system is able to provide notifications that align with a sensitivity of a driver of an ego vehicle so that false positive notifications are beneficially suppressed.

In some embodiments, the notification system beneficially uses this feedback to adjust weights included in the severity equation and also select a different severity equation for determining the severity of the adverse driving conditions. In this way the notification system is able to provide select a severity equation that calculates severity in a way that more aligned with the sensitivity of the driver of the ego vehicle (relative to the severity equation used prior to receiving the feedback) so that false positive notifications are beneficially suppressed.

Described herein are embodiments of a notification system, method, and a computer program product. In some embodiments, the notification system beneficially solves one or more of the example problems described above.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including detecting, based one or more first sensor measurements recorded by a sensor set of an ego vehicle, a presence of an adverse driving condition caused by a remote vehicle; determining a first severity of the adverse driving condition based at least in part on the one or more first sensor measurements; determining a second severity of the adverse driving condition based at least in part on one or more second sensor measurements; providing, by the ego vehicle, a notification of the adverse driving condition caused by the remote vehicle responsive to the second severity increasing relative to the first severity so that an increasing severity trend is present where the notification is not provided if the increasing severity trend is not present. Other embodiments of this aspect include corresponding computer systems, apparatus, and computer programs recorded on one or more computer storage devices, each configured to perform the actions of the methods.

Implementations may include one or more of the following features. The method where the presence of the adverse driving condition is detected based at least in part on inputting the first sensor measurements into a transformer-based Artificial Intelligence (AI) model and executing the transformer-based AI model by a processor to generate analysis data describing the presence of an adverse driving condition caused by a remote vehicle. The first sensor measurements and the second sensor measurements include moment pattern data describing a moment pattern caused by an operation of the remote vehicle. The moment pattern describes a period of a space between the remote vehicle and an ego vehicle when the remote vehicle is stopped behind the ego vehicle. The moment pattern describes a period of a swerve caused by the remote vehicle swerving. The moment pattern changes over time between a first time when the one or more first sensor measurements are recorded and a second time when the one or more second sensor measurements are recorded. The first severity and the second severity are determined by a processor executing a severity equation that is customized based on a sensitivity of a driver of an ego vehicle. The first severity and the second severity are determined by a processor executing a selected severity equation that is selected from a plurality of severity equations. The sensitivity of the driver is determined based on feedback provided by the driver and describing or indicating which adverse driving conditions merit providing the driver with a notification. The sensitivity of the driver describes the driver's opinion about which adverse driving conditions merit providing the driver with a notification. The selected severity equation is selected from the plurality based on the selected severity equation outputting severity calculations that are most aligned with a sensitivity of a driver of an ego vehicle relative to the severity calculations outputted by non-selected equations included in the plurality. A determination that the selected severity equation is most aligned with the sensitivity of the driver is based on feedback received from the driver. Implementations of the described techniques may include hardware, a method or process, or computer software on a computer-accessible medium.

One general aspect includes a system including a non-transitory memory; and a processor communicatively coupled to the non-transitory memory, where the non-transitory memory stores computer readable code that is operable, when executed by the processor, to cause the processor to execute steps including: detecting, based one or more first sensor measurements recorded by a sensor set of an ego vehicle, a presence of an adverse driving condition caused by a remote vehicle; determining a first severity of the adverse driving condition based at least in part on the one or more first sensor measurements; determining a second severity of the adverse driving condition based at least in part on one or more second sensor measurements; providing, by the ego vehicle, a notification of the adverse driving condition caused by the remote vehicle responsive to the second severity increasing relative to the first severity so that an increasing severity trend is present where the notification is not provided if the increasing severity trend is not present. Other embodiments of this aspect include corresponding computer systems, apparatus, and computer programs recorded on one or more computer storage devices, each configured to perform the actions of the methods.

Implementations may include one or more of the following features. The system where the presence of the adverse driving condition is detected based at least in part on inputting the first sensor measurements into a transformer-based AI model and executing the transformer-based AI model by a processor to generate analysis data describing the presence of an adverse driving condition caused by a remote vehicle. The first sensor measurements and the second sensor measurements include moment pattern data describing a moment pattern caused by an operation of the remote vehicle. The moment pattern describes a period of a space between the remote vehicle and an ego vehicle when the remote vehicle is stopped behind the ego vehicle. The moment pattern describes a period of a swerve caused by the remote vehicle swerving. The moment pattern changes over time between a first time when the one or more first sensor measurements are recorded and a second time when the one or more second sensor measurements are recorded. Not providing the notification if the increasing severity trend is not present reduces false positive notifications of adverse driving conditions that are not threats to the driver sufficient to satisfy a threshold for severity. Implementations of the described techniques may include hardware, a method or process, or computer software on a computer-accessible medium.

One general aspect includes a computer program product including computer code stored on a non-transitory memory that is operable, when executed by a processor, to cause the processor to execute steps including: detecting, based one or more first sensor measurements recorded by a sensor set of an ego vehicle, a presence of an adverse driving condition caused by a remote vehicle; determining a first severity of the adverse driving condition based at least in part on the one or more first sensor measurements; determining a second severity of the adverse driving condition based at least in part on one or more second sensor measurements; providing, by the ego vehicle, a notification of the adverse driving condition caused by the remote vehicle responsive to the second severity increasing relative to the first severity so that an increasing severity trend is present where the notification is not provided if the increasing severity trend is not present. Other embodiments of this aspect include corresponding computer systems, apparatus, and computer programs recorded on one or more computer storage devices, each configured to perform the actions of the methods.

Implementations may include one or more of the following features. The computer program product where the first sensor measurements and the second sensor measurements include moment pattern data describing a moment pattern caused by an operation of the remote vehicle. Not providing the notification if the increasing severity trend is not present beneficially reduces false positive notifications of adverse driving conditions that are not threats to the driver sufficient to satisfy a threshold for severity. Implementations of the described techniques may include hardware, a method or process, or computer software on a computer-accessible medium. Other embodiments of this aspect include corresponding computer systems, apparatus, and computer programs recorded on one or more computer storage devices, each configured to perform the actions of the methods.

BRIEF DESCRIPTION OF THE DRAWINGS

The disclosure is illustrated by way of example, and not by way of limitation in the figures of the accompanying drawings in which like reference numerals are used to refer to similar elements.

FIG. 8 is a block diagram illustrating example severity equations for calculating severity by the notification system according to some embodiments.

DETAILED DESCRIPTION

Figure 1:
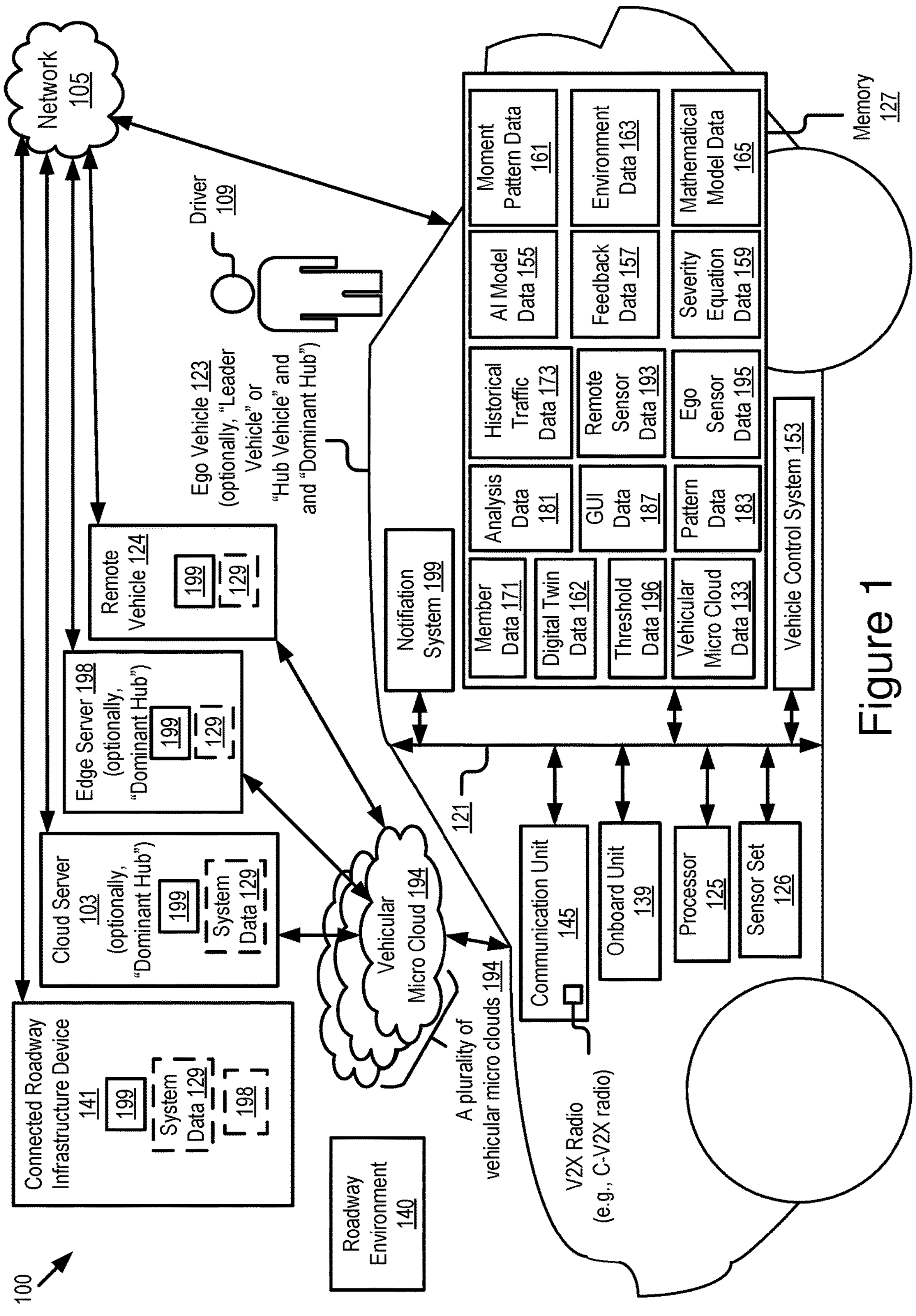
FIG. 1 is a block diagram illustrating an operating environment for a notification system according to some embodiments.

Described herein are embodiments of a notification system. The functionality of the notification system is now introduced according to some embodiments.

Vehicles include onboard sensors that constantly record sensor data describing sensor measurements of the onboard sensors. These sensor measurements describe the external environment of the vehicle.

In some embodiments, the sensor data is time stamped so that individual sensor measurements recorded by the onboard sensors include a time stamp describing the time when the sensor measurement was recorded. Time data includes digital data that describes the time stamps for the sensor measurements that are described by the sensor data. Vehicles transmit V2X messages to one another. In some embodiments, vehicles transmit V2X messages to one another that includes their sensor data so that other vehicles can confirm their own sensor measurements or improve the accuracy or confidence of their calculations by having a larger set of sensor data to use for these calculations.

The sensor data includes digital data describing the sensor measurements recorded by the onboard sensors (e.g., the sensor set). In some embodiments, instances of sensor data describe one or more sensor measurements, and the instances of sensor data are timestamped with time data to indicate the time when the one or more sensor measurements were recorded.

In some embodiments, vehicles such as an ego vehicle and a remote vehicle cause their onboard sensor sets to record sensor data describing sensor measurements of the roadway environment. In some embodiments, one or more parameters are predefined, and the sensors measure sensor data relevant to these parameters and then uses this digital data to provide some or all of the functionality of the notification system. For example, the notification system uses the sensor data to provide some or all of the functionality described below with reference to one or more of the example general method, the method 300 depicted in FIG. 3, and the method 600 depicted in FIGS. 6A and 6B. A predefined parameter includes, for example, any variable within the roadway environment that is capable of direct or indirect measurement using one or more sensors included in a sensor set of one or more vehicles.

Examples of variables include one or more of the following: stopping distance between vehicles; speed of vehicles; acceleration of vehicles; heading of vehicles; traffic pattern of vehicles and/or traffic management objects; presence of construction in the roadway; presence of obstruction in the roadway; presence of animal in the roadway or adjacent to the roadway; presence of active law enforcement or first responders in the roadway (e.g., flashing police lights cause bottlenecks); any other measurable variable within a roadway environment.

Ego sensor data includes digital data that describes the sensor measurements recorded by the sensor set of an ego vehicle. An example of the ego sensor data in some embodiments includes the ego sensor data 195 depicted in FIG. 1. In some embodiments, the sensor measurements described by the ego sensor data 195 are time stamped. Time data includes digital data that describes the time stamps for the sensor measurements described by the ego sensor data 195.

Remote vehicles also include sensor sets similar to those included in the ego vehicle. Remote sensor data includes digital data that describes the sensor measurements recorded by the sensor set of a remote vehicle. An example of the remote sensor data in some embodiments includes the remote sensor data 193 depicted in FIG. 1. In some embodiments, the sensor measurements described by the remote sensor data 193 are time stamped. Time data includes digital data that describes the time stamps for the sensor measurements described by the remote sensor data 193.

In some embodiments, the remote sensor data 193 is beneficial because it gives the notification system a larger data set to rely upon, along with the ego sensor data 195, when executing some or all of the steps described below with reference to the example general method, the method 300, and the method 600. In some embodiments, the remote sensor data 193 is used by the notification system 199 to detect adverse driving conditions, determine the severity of adverse driving conditions, and determining whether and when to notify a driver of a detected adverse driving condition.

In some embodiments, the remote sensor data 193 is beneficial, for example, because it helps the notification system have a better understanding of roadway environment of the ego vehicle (e.g., because the sensors of the remote vehicle are more accurate than those of the ego vehicle or have a different perspective relative to the sensors of the ego vehicle due to their different orientation or proximity relative to the sensors of the ego vehicle).

In some embodiments, V2X messages include vehicular micro cloud data as the payload for the V2X messages. In some embodiments, the vehicular micro cloud data includes digital data that includes one or more of the sensor data and the time data. An example of the vehicular micro cloud data according to some embodiments includes the vehicular micro cloud data 133 depicted in FIG. 1.

In some embodiments, V2X messages include other types of data as well, including, for example instructions to form a vehicular micro cloud, instructions for steps to be executed, requests for additional data, and any other data described herein or beneficial to execute the methods described herein.

In some embodiments, the remote sensor data 193 is transmitted to the ego vehicle via V2X messages. In some embodiments, V2X messages include vehicular micro cloud data in their payload. The vehicular micro cloud data includes, among other things, the sensor data such as the remote sensor data 193 that vehicles record using their sensor sets. Vehicles that receive these V2X messages, such as the ego vehicle, use this vehicular micro cloud data to improve their awareness of their environment. For vehicles that include vehicle control systems such as Advanced Driver Assistance Systems (ADAS systems) or autonomous driving systems, the vehicular micro cloud data is inputted to these systems so that they can better understand their driving environment when providing their functionality. Similarly, the remote sensor data is also used by the ego vehicle to improve the accuracy of the results from executing one or more of the example general method, the method 300, and the method 600.

In some embodiments, V2X messages are not used to request information describing future driving maneuvers of other vehicles (i.e., a maneuver request). For example, in some embodiments vehicles do not share maneuver requests, reply to maneuver requests, or otherwise directly inform vehicles about their current and/or future driving maneuvers (although this information might be discernable by the notification system based on the sensor data available to the notification system).

In some embodiments, V2X messages are used to request information from other vehicles describing their future driving maneuvers (i.e., a maneuver request). For example, in some embodiments vehicles do share maneuver requests, reply to maneuver requests, and otherwise directly inform other vehicles about their current and/or future driving maneuvers. In some embodiments, this same or similar information is discernable by the notification system based on the sensor data available to the notification system without having to transmit and receive responses to maneuver requests.

In some embodiments, the notification system 199 seeds a digital twin simulation software with sensor data and executes one or more digital twin simulations generate digital data that predicts the future driving maneuvers of one or more remote vehicles that are proximate to the ego vehicle as determined by the digital twin simulation. In some embodiments, the digital twin simulations can be seeded with other data as well such as, for example, historical traffic data in order to improve the quality of the digital twin simulation.

In some embodiments, the notification system 199 seeds an AI module with sensor data and executes the AI module to generate digital data that predicts the future driving maneuvers of one or more remote vehicles that are proximate to the ego vehicle as determined by the digital twin simulation. In some embodiments, AI module can be seeded with other data as well such as, for example, historical traffic data in order to improve the quality of the digital twin simulation.

In some embodiments, the historical traffic data includes digital data that describes real-life traffic information. The historical traffic data may be recorded by any entity (e.g., government, academic, research, military, corporation, private persons, etc.). In some embodiments, the historical traffic data is recorded by a vehicular micro cloud. In some embodiments, the historical traffic data is recorded by vehicles such as the ego vehicle 123 and the remote vehicle 124 depicted in FIG. 1 using their onboard sensor sets 126. An example of the historical traffic data according to some embodiments includes the historical traffic data 173 depicted in FIG. 1.

In some embodiments, the AI module includes software (herein "AI modeling software") having an AI model that is seeded with digital data (e.g., training data) that teaches the AI model about how to identify patterns and use these patterns to predict, among other things, future driving maneuvers of vehicles and other roadway objects (e.g., animals, humans, vehicles, debris, bikes, scooters, etc.). In some embodiments, the AI model includes one or more of a neural network and a transformer-based AI model. In some embodiments, the neural network includes a convolutional neural network. In some embodiments, the AI model includes any deep learning-based model or any derivative or equivalent thereof.

In some embodiments, the notification system 199 includes the AI module in the codes and routines that are included in the notification system 199. AI model data includes digital data that describes the AI model used or included in the AI module. An example of the AI model data according to some embodiments includes the AI model data 155 depicted in FIG. 1. In some embodiments, the AI model data 155 includes any digital data that is necessary for the notification system 199 to provide its functionality using an AI model as described herein.

In some embodiments, the notification system 199 seeds one or more mathematical models with sensor data and executes these models to generate digital data that predicts the future driving maneuvers of one or more remote vehicles that are proximate to the ego vehicle as determined by the digital twin simulation. The mathematical model includes a mathematical representation of the roadway environment that includes, among other things, the ego vehicle and one or more remote vehicles. Mathematical model data includes digital data that describes the mathematical model. An example of the mathematical model data according to some embodiments includes the mathematical model data 165 depicted in FIG. 1. In some embodiments, the mathematical model data 165 includes any digital data that is necessary for the notification system 199 to provide its functionality using a mathematical model as described herein.

In some embodiments, the notification system includes code and routines that are operable, when executed by a processor, to execute one or more of the following techniques to predict future driving maneuvers: digital twin simulation; AI modeling; and mathematical modeling. In some embodiments, the notification system includes code and routines that are operable to use one or more of these same techniques to generate pattern data that describes patterns are present and/or predicted to be present within the roadway environment. The notification system includes code and routines that are operable, when executed by a processor, to analyze the pattern data, optionally in combination with the sensor data, to generate analysis data that describes the presence of an adverse driving condition within the roadway environment.

The pattern data includes digital data that describes the patterns that are present and/or predicted to be present within the roadway environment. In some embodiments, for predicted patterns, the pattern data includes digital data that describes a probability that the predicted future driving maneuvers will occur and/or a risk of an adverse driving condition being caused by the predicted future driving maneuvers. In some embodiments, the notification system uses the historical traffic data to determine the risk. In some embodiments, the risk is generated by the notification system as an element of executing one or more of the digital twin simulation, AI modeling, and mathematical modeling. The "risk" may also be described as a probability that a future event predicted by the notification system will actually occur.

In some embodiments, the notification system also generates digital data describing a time range when a future event (e.g., adverse driving condition) predicted by the notification system will actually occur. For example, if the notification system predicts a collision will occur in the future based on predicted future driving maneuvers, then the notification system also generates pattern data that describes a time range (e.g., 0.1 to 2 seconds from now) when the predicted adverse driving condition is predicted to occur.

In some embodiments, the patterns described by the pattern data describe future driving maneuvers of vehicles on the roadway (e.g., one or more remote vehicles, the ego vehicle, etc.) and adverse driving conditions that are predicted or possible based on the patterns described by the pattern data.

Thus, in some embodiments the pattern data describes one or more of the following: current driving maneuvers present on the roadway; present patterns of driving maneuvers on the roadway; current adverse driving conditions present on the roadway; predicted future driving maneuvers on the roadway (and, optionally, one or more of a probability that this prediction is accurate and a time range when the prediction is predicted to be observable on the roadway); predicted future patterns of driving maneuvers on the roadway (and, optionally, one or more of a probability that this prediction is accurate and a time range when the prediction is predicted to be observable on the roadway); predicted future adverse driving conditions that are predicted to be present on the roadway (and, optionally, one or more of a probability that this prediction is accurate and a time range when the prediction is predicted to be observable on the roadway). An example of the pattern data according to some embodiments includes the pattern data 183 depicted in FIG. 1.

Described above are examples of the notification system using one or more of digital twin simulation, AI modeling, and mathematical modeling to determine pattern data and/or determine a presence of adverse driving conditions. In some embodiments, the notification system includes code and routines that are operable, when executed by a processor, to execute one or more of a digital twin simulation, an AI modeling, and a mathematical modeling to execute any analysis described herein.

For example, in some embodiments, the notification system includes code and routines that are operable, when executed by a processor, to execute one or more of a digital twin simulation, an AI modeling, and a mathematical modeling to identify patterns of driving behavior that, when present on the roadway concurrently, pose a safety risk to a driver that satisfies a threshold unsafety. The historical traffic data is inputted to one or more of digital twin simulation, AI modeling, and mathematical modeling which are then executed by the notification system to output pattern data describing patterns of driving that are classified as "adverse driving conditions." This is a "first output" as described in this paragraph. The notification system then inputs sensor data to one or more of digital twin simulation, AI modeling, and mathematical modeling, which are then executed to identify present driving patterns on the roadway and/or predicted future driving patterns that are predicted to be on the roadway at a specified time period in the future. This is a "second output" as described in this paragraph. The notification system then compares the first output to the second output to determine a presence of one or more adverse driving conditions on the roadway. This is a "third output" as used herein. As used herein, the first output and the second output are examples of pattern data according to some embodiments. Thus, the pattern data describes any type of pattern that is present and/or predicted to be present within the roadway environment. Analysis data includes digital data that describes any analysis described herein are the output of this analysis. Thus, the first output, second output, and third output are examples of analysis data. An example of the analysis data according to some embodiments includes the analysis data 181 depicted in FIG. 1.

In some embodiments, a vehicular micro cloud includes an ego vehicle and a plurality of remote vehicles. The ego vehicle generates its own ego sensor data. The remote vehicles each generate their own remote sensor data. The members of the vehicular micro cloud transmit V2X messages to one another including vehicular micro cloud data including digital data describing their sensor measurements (e.g., one or more of the ego sensor data, the remote sensor data, and the time data). In this way, the members of the vehicular micro cloud share their sensor measurements with one another so that a notification system has access to the sensor measurements recorded by the members of the vehicular micro cloud. In a similar manner, members share any digital data described herein with other members and/or with other vehicular micro clouds. Examples of such digital data are depicted in FIG. 1, including any of the data depicted in FIG. 1 as being stored on memory 127.

In some embodiments, a vehicular micro cloud includes an ego vehicle and a plurality of remote vehicles. The ego vehicle generates its own ego sensor data. The remote vehicles each generate their own remote sensor data. The members of the vehicular micro cloud transmit V2X messages to one another including vehicular micro cloud data including digital data describing their sensor measurements (e.g., one or more of the ego sensor data, the remote sensor data, and the time data). In this way, the members of the vehicular micro cloud share their sensor measurements with one another so that a notification system has access to the sensor measurements recorded by the members of the vehicular micro cloud.

An example of one specific type of sensor data includes GPS data. "GPS" refers to "geographic positioning system." The GPS data includes digital data that describes the geographic location of an object such as a vehicle or any other object that might be a present or a future location an adverse driving condition.

An example of the vehicular micro cloud data according to some embodiments includes the vehicular micro cloud data 133 depicted in FIG. 1. For example, with reference to FIG. 1, the remote sensor data is received by the communication unit of the ego vehicle via a V2X transmission that includes vehicular micro cloud data including the remote sensor data as its payload; the notification system of the ego vehicle then parses the remote sensor data from the vehicular micro cloud data and stores the vehicular micro cloud data and the remote sensor data in the memory 127 of the ego vehicle 123.

In some embodiments, the vehicular micro cloud data includes the member data for the vehicular micro cloud. In this way, members of a vehicular micro cloud share sensor data and member data with one another. The member data describes, among other things, which tasks are assigned to which member of the vehicular micro cloud. The member data is described in more detail below. An example of the member data according to some embodiments includes the member data 171 depicted in FIG. 1.

Vehicular Micro Clouds

Some of the embodiments described herein include a plurality of vehicular micro clouds. For example, the ego vehicle and the remote vehicle are connected vehicles (e.g., vehicles that include a processor, a communication unit, and an instance of the notification system) and members of one or more of a plurality of vehicular micro clouds. In some embodiments, the vehicular micro cloud hosts the notification system in a distributed fashion using the computing resources of the vehicles that are members of the vehicular micro cloud so that a cloud server and/or an edge server is not strictly necessary to provide the service of the notification system to the users of the notification system.

In some embodiments, a server such as a cloud server and/or an edge server is also an element of the vehicle micro cloud. A cloud server includes a conventional hardware server having network communication capabilities such as a computer, a laptop, a microcomputer, etc. An example of a cloud server according to some embodiments includes a cloud server 103 as depicted in FIG. 1. An edge server includes a conventional hardware server having network communication capabilities such as a computer, a laptop, a microcomputer, etc. An example of an edge server according to some embodiments includes an edge server 198 as depicted in FIG. 1. A cloud server includes a conventional hardware server having network communication capabilities such as a computer, a laptop, a microcomputer, etc. An example of an edge server according to some embodiments includes a cloud server 103 as depicted in FIG. 1.

In some embodiments, an edge server is an element of a roadside unit (RSU) that is located within a roadway environment. By contrast, a cloud server is generally not located within a roadway environment. An example of an RSU according to some embodiments includes the connected roadway infrastructure device 141 depicted in FIG. 1. A connected roadway infrastructure device 141 includes, for example, an RSU having a processor and a communication unit such as those described below as elements of the ego vehicle 123.

In some embodiments, a vehicular micro cloud includes a group of connected vehicles where vehicles perform task(s) cooperatively/collaboratively. Vehicular micro clouds can be divided into two categories based on their mobility: (1) stationary; and (2) mobile. An example of a vehicular micro cloud according to some embodiments includes a vehicular micro cloud 194 depicted in FIG. 1. As depicted in FIG. 1, an operating environment 100 for the notification system 199 includes a plurality of vehicular micro clouds 194.

In the stationary cloud, a certain geographical region is designated as the vehicular micro cloud region, and vehicles entering that region contribute their resources for vehicular cloud services. A stationary vehicular micro cloud is sometimes referred to as a "static" vehicular micro cloud.

In the mobile vehicular cloud, on the other hand, the vehicular micro cloud moves as the micro cloud members move. A mobile vehicular micro cloud is sometimes referred to as a "dynamic" vehicular micro cloud.

In some embodiments, as an optional operating environment, the notification system is hosted by a plurality of members of a vehicular micro cloud. In some embodiments, these members are also registered with the notification system. For example, for each member the notification system has access to digital data that includes a unique identifier of the member. In some embodiments, each instance of digital data shared among the members of the vehicular micro cloud include one or more bits of data that include this unique identifier so that attribution of the digital data is provided; this attribution is beneficial to monitor and improve the functionality of the notification system as well as identify malicious users (e.g., members of the vehicular micro cloud that are controlled by malicious entities that provide intentionally false information or otherwise take actions to cause harm or subvert the proper functioning of any entity of system described herein)

In some embodiments, the notification system causes the vehicles, which each include an instance of the notification system or at least a subset of the code and routines of the notification system, to execute steps to form the vehicular micro cloud.

Member data includes digital data that describes information about a vehicular micro cloud and its members. For example, the member data is digital data that describes the identity of the members of the vehicular micro cloud and their specific computing resources; all members of the vehicular micro cloud make their computing resources available to one another for their collective benefit. An example of the member data according to some embodiments includes the member data 171 depicted in FIG. 1. In some embodiments, a plurality of the members execute steps to generate pattern data or any other digital data described herein and then share this digital data with other members of one or more vehicular micro clouds.

In some embodiments, the notification system 199 includes code and routines that are operable, when executed by a processor, to cause the communication unit to transmit a wireless message to candidates for membership in the vehicular micro cloud that causes these candidates to join the vehicular micro cloud or request permission to join the vehicular micro cloud. In some embodiments, membership is limited to entities having unused computing resources that are sufficient to satisfy a threshold for membership. In some embodiments, the list of candidates is determined by the notification system based on the technical data which is transmitted by the candidates to one another via V2X messages (e.g., Basic Safety Messages that are transmitted at a predetermined time interval); in some embodiments, these V2X messages also include sensor data recorded by the vehicles that transmit the V2X messages.

In some embodiments, vehicles are grouped into different vehicular micro clouds based on their competing behaviors as evidenced by the sensor data. For example, vehicles are grouped together based on their relative location on the roadway since these vehicles may have similar interests or informational needs since they may be affected by the same adverse driving conditions.

In some embodiments, the notification system 199 for a hub of a specific vehicular micro cloud determines candidates to join the vehicular micro cloud managed by the hub as new vehicles come within V2X communication range of the hub (e.g., within 1,500 feet or some other transmission range included with V2X communication).

In some embodiments, when a new vehicle joins the vehicular micro cloud managed by the hub, the hub generates new member data for the vehicular micro cloud including, among other things, digital data describing the schedule of tasks which includes those tasks assigned to the new member. The hub then transmits V2X messages to the members of the vehicular micro cloud that includes vehicular micro cloud data that distributes the new member data to the members of the vehicular micro cloud, including the new member. The notification system for the new member is now responsible for executing the tasks assigned to it by the hub as described in the member data. The tasks may include computational tasks such as one or more of the following: generating sensor data; generating pattern data; identify adverse driving conditions; executing any step or sub-step of any method described herein; executing any analysis or portion of any analysis described herein, etc. Other tasks are now described.

As briefly introduced above, vehicular micro clouds provide vehicular micro cloud tasks. A vehicular micro cloud task includes any task executed by a vehicular micro cloud or a group of vehicular micro clouds. As used herein, the terms "task" and "vehicular micro cloud task" refer to the same thing. A "sub-task" as used herein is a portion of a task or vehicular micro cloud task. An example of a task includes, for example, executing a computing process that is an element of delivering a vehicular cloud service to one or more members of the vehicular micro cloud.

In some embodiments, the member data describes, for each member of a particular vehicular micro cloud, the tasks assigned to each member. The member data also describes a schedule of tasks for the vehicular micro cloud. A schedule of tasks described by the member data 171 includes, for one or more vehicular micro clouds, digital data that describes one or more of the following: (1) what tasks are assigned; (2) for each assigned task, which member it is assigned to; and (3) for each assigned task, time(s) when the task is to be started and/or completed. In some embodiments, the members of a vehicular micro cloud exchange V2X messages and the vehicular micro cloud data includes, among other types of digital data, the member data.

In some embodiments, the vehicular micro cloud assigned by the hub of a micro cloud includes some or all of the tasks which are necessary to provide one or more vehicular cloud services.

In some embodiments, the notification system includes code and routines that are operable, when executed by a processor, to cause the processor to receive member data for a plurality of vehicular micro clouds and organize a schedule of tasks for the members of the plurality of vehicular micro clouds that is operable to ensure that the plurality of vehicular cloud services provided by the plurality of vehicular micro clouds is uninterrupted even as members are entering and leaving different vehicular micro clouds.

In some embodiments, a vehicular micro cloud includes a group of connected vehicles that communicate with one another via V2X messages to provide, among other things such as a vehicular cloud service, the service of the notification system to the ego vehicle and/or the members of the vehicular micro cloud.

The vehicular micro cloud includes multiple members. A member of the vehicular micro cloud includes a connected vehicle that sends and receives V2X messages via a network (e.g., the network 105 depicted in FIG. 1). In some embodiments, the network is a serverless ad-hock vehicular network. In some embodiments, the members of the network are nodes of the serverless ad-hoc vehicular network.

In some embodiments, a serverless ad-hoc vehicular network is "serverless" because the serverless ad-hoc vehicular network does not include a server. In some embodiments, a serverless ad-hoc vehicular network is "ad-hoc" because the serverless ad-hoc vehicular network is formed its members when it is determined by one or more of the members to be needed or necessary. In some embodiments, a serverless ad-hoc vehicular network is "vehicular" because the serverless ad-hoc vehicular network only includes connected vehicles as its endpoints. In some embodiments, the term "network" refers to a V2V network.

In some embodiments, the vehicular micro cloud only includes vehicles. For example, the serverless ad-hoc network does not include the following: an infrastructure device, a base station, a roadway device, a connected roadway infrastructure device; an edge server, an edge node, and a cloud server. An infrastructure device includes any hardware infrastructure device in a roadway environment such as a traffic signal, traffic light, traffic sign, or any other hardware device that has or does not have the ability to wirelessly communicate with a wireless network. In some embodiments, the edge server 198 depicted in FIG. 1 is an element of a hardware infrastructure device. In some embodiments, the connected roadway infrastructure device 141 depicted in FIG. 1 is an example of an infrastructure device.

In some embodiments, the serverless ad-hoc vehicular network includes a set of sensor rich vehicles. A sensor rich vehicle is a connected vehicle that includes a rich sensor set. In some embodiments, one or more of the ego vehicle and the remote vehicle depicted in FIG. 1 are examples of a sensor rich vehicle. Although only one remote vehicle is depicted in FIG. 1, in practice the operating environment may include one or more remote vehicles.

In some embodiments, an operating environment that includes the serverless ad-hoc vehicular network also includes a legacy vehicle. A legacy vehicle is a connected vehicle that includes a legacy sensor set. In some embodiments, the overall sensing ability of the sensor set included in the ego vehicle is greater than the overall sensing ability of the legacy sensor set. For example, a roadway environment includes a set of sensor rich vehicles (e.g., the ego vehicle, the remote vehicle, etc.) and a legacy vehicle; the rich sensor set of these sensor rich vehicles is operable to generate sensor measurements that more accurately describe the geographic locations of objects in the roadway environment when compared to the sensor measurements generated by the legacy sensor set.

In some embodiments, the legacy vehicle is an element of the serverless ad-hoc vehicular network. In some embodiments, the legacy vehicle is not an element of the serverless ad-hoc vehicular network. In some embodiments, the serverless ad-hoc vehicular network is a vehicular micro cloud. It is not a requirement of the embodiments described herein that the serverless ad-hoc vehicular network is a vehicular micro cloud. Accordingly, in some embodiments the serverless ad-hoc vehicular network is not a vehicular micro cloud.

In some embodiments, the serverless ad-hoc vehicular network includes a similar structure that is operable to provide some or all of the functionality as a vehicular micro cloud. Accordingly, a vehicular micro cloud is now described according to some embodiments to provide an understanding of the structure and functionality of the serverless ad-hoc vehicular network according to some embodiments.

When describing the vehicular micro cloud, the term "vehicular micro cloud" can be replaced by the term "group of connected vehicles." This however does not change the requirements of what constitutes a "vehicular micro cloud" as described herein since not all "groups of connected vehicles" are also "vehicular micro clouds." For example, a mere platoon of connected vehicles is generally not a vehicular micro cloud since the platoon does not require its members to dedicate a threshold amount of unused computing resources for the benefit of each member of the platoon, whereas vehicular micro clouds as described herein require its members to dedicate a threshold amount of unused computing resources for the benefit of each member of the vehicular micro cloud.

Distributed data storage and computing by a group of connected vehicles (i.e., a "vehicular micro cloud") is a promising solution to cope with an increasing network traffic generated for and by connected vehicles. Vehicles collaboratively store (or cache) data sets in their onboard data storage devices and compute and share these data sets over vehicle-to-vehicle (V2V) networks as requested by other vehicles. Using vehicular micro clouds removes the need for connected vehicles to access remote cloud servers or edge servers by vehicle-to-network (V2N) communications (e.g., by cellular networks) whenever they need to get access to unused computing resources such as shared data (e.g., some or all of the system data 129 described herein), shared computational power, shared bandwidth, shared memory, and cloudification services.

Example Vehicular Micro Cloud Tasks

Examples of vehicular micro cloud tasks (herein, “tasks”) are now described according to some embodiments. Vehicular micro clouds are motivated by the emerging concept of “vehicle cloudification.” Vehicle cloudification means that vehicles equipped with on-board computer unit(s) and wireless communication functionalities form a cluster, called a vehicular micro cloud, and collaborate with other members of the vehicular micro cloud over V2V networks or V2X networks to perform computation, data storage, and data communication tasks in an efficient way. These types of tasks are referred to herein as “vehicular micro cloud tasks” or “tasks” if plural, or a “vehicular micro cloud task” or “task” if singular.

In some embodiments, executing any step or sub-step of any of the methods described herein are examples of a task that is executable by one or more members of a vehicular micro cloud.

In some embodiments, a vehicular micro cloud task includes any computational task, data storage task, data communication task, or driving maneuvers collaboratively performed by a plurality of the members of a vehicular micro cloud. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to identify a problem (e.g., detecting an adverse driving condition), and the result includes digital data that describes the solution to the problem (e.g., executing an analysis to determine whether to notify a driver about the adverse driving condition while also minimizing the occurrence of false positive notifications).

In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, an analysis to generate one or more of pattern data or moment pattern data as described herein are examples of a computational task performed by one or more members of a vehicular micro cloud (and not the ego vehicle alone). In some embodiments, one or more members of a vehicular micro cloud analyzing the severity of an adverse driving condition using one or more severity equations (e.g., such as depicted in FIG. 8) is another example of a computational task. These examples are illustrative and not limiting. Other examples are possible.

In some embodiments, a data storage task includes a processor storing digital data in a memory of a connected vehicle. For example, a digital data file which is too big to be stored in the memory of any one vehicle is stored in the memory of multiple vehicles. In some embodiments, the data storage task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. In this way, the plurality of micro cloud members work together collaboratively to complete the data storage task. For example, a sub-task for a data storage task includes storing a portion of a digital data file in a memory of a micro cloud member; other micro cloud members are assigned sub-tasks to store the remaining portions of digital data file in their memories so that collectively the entire file is stored across the vehicular micro cloud or a sub-set of the vehicular micro cloud.

For example, in some embodiments one or more of the sensor data and the pattern data are stored among one or more members of a vehicular micro cloud and distributed to one or more of the members upon request of one or more of the members. In some embodiments, the system data (e.g., some or all of the digital data described herein and depicted in FIG. 1 as being stored in the memory 127) is distributed to one or more members of the vehicular micro cloud proactively responsive to formation of the vehicular micro cloud. In some embodiments, one or more of the historical traffic data, the severity equation data, and the pattern data described herein is distributed proactively to one or more members of the vehicular micro cloud responsive to forming a vehicular micro cloud or determining a presence of an adverse driving condition. These examples are illustrative and not limiting. Other examples are possible. In some embodiments, a vehicular micro cloud is formed by the notification system of a hub responsive to determining a presence of an adverse driving condition or some other triggering event.

In some embodiments, a data communication task includes a processor using some or all of the network bandwidth available to the processor (e.g., via the communication unit of the connected vehicle) to transmit a portion a V2X wireless message to another endpoint. For example, a V2X wireless message includes a payload whose file size is too big to be transmitted using the bandwidth available to any one vehicle and so the payload is broken into segments and transmitted at the same time (or contemporaneously) via multiple wireless messages by multiple micro cloud members.

In some embodiments, the data communication task is broken down into sub-tasks whose completion is equivalent to completion of the data storage task. In this way, the processors of a plurality of micro cloud members are assigned different sub-tasks configured to complete the data storage task; the micro cloud members take steps to complete the sub-tasks in parallel and share the result of the completion of the sub-task with one another via V2X wireless communication. Thus, the plurality of micro cloud members work together collaboratively to complete the data storage task. For example, a sub-task for a data communication task includes transmitting a portion of a payload for a V2X message to a designated endpoint; other micro cloud members are assigned sub-tasks to transmit the remaining portions of payload using their available bandwidth so that collectively the entire payload is transmitted.

In some embodiments, a vehicular micro cloud task includes determining a series of driving maneuvers (a "driving plan") for responding to the adverse driving condition. In some embodiments, the driving plan is configured to obviate the adverse driving condition. In some embodiments, the driving plan is generated using one or more of digital twin simulation, AI modeling, and mathematical modeling as described herein.

In some embodiments, a vehicular micro cloud task is collaboratively performed by the plurality of members executing computing processes in parallel which are configured to complete the execution of the vehicular micro cloud task.

In some embodiments, a vehicular micro cloud includes a plurality of members that execute computing processes whose completion results in the execution of a vehicular micro cloud task. For example, the serverless ad-hoc vehicular network provides a vehicular micro cloud task to a legacy vehicle.

Vehicular micro clouds are beneficial, for example, because they help vehicles to perform computationally expensive tasks (e.g., determining the analysis data, determining pattern data, predicting future driving maneuvers, etc.) that they could not perform alone or store large data sets that they could not store alone. In some embodiments, the computational power of a solitary ego vehicle is sufficient to execute these tasks.

Vehicular micro clouds are described in the patent applications that are incorporated by reference in this paragraph. This patent application is related to the following patent applications, the entirety of each of which is incorporated herein by reference: U.S. patent application Ser. No. 16/943,443 filed on Jul. 30, 2020 and entitled "Vehicular Nano Cloud"; U.S. Pat. No. 10,924,337 issued on Feb. 16, 2021 and entitled "Vehicular Cloud Slicing"; U.S. patent application Ser. No. 15/358,567 filed on Nov. 22, 2016 and entitled "Storage Service for Mobile Nodes in a Roadway Area"; U.S. patent application Ser. No. 15/799,442 filed on Oct. 31, 2017 and entitled "Service Discovery and Provisioning for a Macro-Vehicular Cloud"; U.S. patent application Ser. No. 15/845,945 filed on Dec. 18, 2017 and entitled "Managed Selection of a Geographical Location for a Micro-Vehicular Cloud"; U.S. patent application Ser. No. 15/799,963 filed on Oct. 31, 2017 and entitled "Identifying a Geographic Location for a Stationary Micro-Vehicular Cloud"; U.S. patent application Ser. No. 16/443,087 filed on Jun. 17, 2019 and entitled "Cooperative Parking Space Search by a Vehicular Micro Cloud"; U.S. patent application Ser. No. 16/739,949 filed on Jan. 10, 2020 and entitled "Vehicular Micro Clouds for On-demand Vehicle Queue Analysis"; U.S. patent application Ser. No. 16/735,612 filed on Jan. 6, 2020 and entitled "Vehicular Micro Cloud Hubs"; U.S. patent application Ser. No. 16/387,518 filed on Apr. 17, 2019 and entitled "Reorganizing Autonomous Entities for Improved Vehicular Micro Cloud Operation"; U.S. patent application Ser. No. 16/273,134 filed on Feb. 11, 2019 and entitled "Anomaly Mapping by Vehicular Micro Clouds"; U.S. patent application Ser. No. 16/246,334 filed on Jan. 11, 2019 and entitled "On-demand Formation of Stationary Vehicular Micro Clouds"; and U.S. patent application Ser. No. 16/200,578 filed on Nov. 26, 2018 and entitled "Mobility-oriented Data Replication in a Vehicular Micro Cloud."

Nano clouds are described in more detail below, as well as in U.S. patent application Ser. No. 16/943,443 filed on Jul. 30, 2020, and entitled "Vehicular Nano Cloud," the entirety of which is incorporated herein by reference. Vehicular micro cloud slices are described in more detail in U.S. Pat. No. 10,924,337 issued on Feb. 16, 2021, and entitled "Vehicular Cloud Slicing," the entirety of which is incorporated herein by reference.

In some embodiments, the notification system is operable to execute a set of tasks assigned by a vehicular micro cloud.

The endpoints that are part of the vehicular micro cloud may be referred to herein as "members," "micro cloud members," or "member vehicles." Examples of members include one or more of the following: a connected vehicle; an edge server; a cloud server; a connected roadway infrastructure device; any other connected device that has computing resources and has been invited to join the vehicular micro cloud by a handshake process. In some embodiments, the term "member vehicle" specifically refers to only connected vehicles that are members of the vehicular micro cloud whereas the terms "members" or "micro cloud members" is a broader term that may refer to one or more of the following: endpoints that are vehicles; and endpoints that are not vehicles such as roadside units.

Example General Method

As used herein, the term "sensor data" refers to one or more of the ego sensor data, the remote sensor data, or a combination of the ego data and the remote sensor data.

The driver 109 is a human driver of the ego vehicle 123. In some embodiments, a remote vehicle 124 also includes a driver that is not depicted.

In some embodiments, the vehicular micro cloud data 133 is received by the ego vehicle 123 because the ego vehicle 123 and the remote vehicle 124 are members of the same vehicular micro cloud 194.

Threshold data includes digital data that describes any threshold described herein. An example of the threshold data includes the threshold data 196 depicted in FIG. 1.

Analysis data includes digital data that describes the output or process of any analysis executed by the notification system 199. For example, the analysis data describes any output executed following the execution of any method described herein (e.g., one or more of the example general method, method 300, and method 600). An example of the analysis data according to some embodiments includes the analysis data 181 depicted in FIG. 1.

In some embodiments, a vehicle includes a notification system. A notification system includes one or more electronic devices that are operable to provide a notification to a driver of a vehicle about adverse driving conditions having an increase severity trend as determined by the notification system. An example of a notification includes one or more of the following: a graphical user interface (GUI); a visual display; an audible sound; one or more lights, or some other human discernable stimulation that provides information to a driver of a vehicle (e.g., the ego vehicle 123, the remote vehicle 124). In some embodiments, the notification is operable to inform the driver of the vehicle about the existing or future adverse driving condition. An example of the notification system according to some embodiments includes the notification system 199 depicted in FIG. 2.

According to some embodiments, the notification system includes one or more of the following: an electronic display; a speaker; a heads-up display unit; an infotainment system; a vibration device; a light emitting device; etc. In some embodiments, the notification system is operable to receive vehicular micro cloud data including any of the digital data described herein.

GUI data includes digital data that describes a GUI. For example, a GUI that describes one or more of the following: existing or future adverse driving condition, a risk posed by the adverse driving condition, a likelihood of the adverse driving condition occurring, and the steps of the driving plan that are executable to obviate the adverse driving condition. An example of the GUI data according to some embodiments includes the GUI data 187 depicted in FIG. 1.

In some embodiments, the electronic display device is embedded in a surface of the ego vehicle such as a rear-view mirror, a side mirror, a windshield, etc. In some embodiments, the electronic display device is an element of an infotainment system of the ego vehicle.

In some embodiments, obviation of the existing or adverse driving condition is not possible and the driving plan is instead operable to reduce a risk posed by the existing or future adverse driving condition.

A vehicle control system is an onboard system of a vehicle that controls the operation of a functionality of the vehicle. ADAS systems and autonomous driving systems are examples of vehicle control systems. Examples of the vehicle control system according to some embodiments includes the vehicle control system 153 depicted in FIGS. 1 and 2 and the autonomous driving system 152 depicted in FIG. 2.

In some embodiments, the notification system includes code and routines that are operable, when executed by a processor, to cause the processor to execute one or more steps of an example general method described herein. The notification system may be an element of one or more of the following: an ego vehicle; a remote vehicle; a connected roadway infrastructure device; a cloud server; and an edge server installed in a roadway device such as a roadside unit (RSU). As described, the notification system is an element of the ego vehicle, but this description is illustrative and not intended to be limiting.

In some embodiments, these steps are executed by a processor or onboard vehicle computer of an ego vehicle. The ego vehicle is a connected vehicle. A connected vehicle is a vehicle that includes a communication unit. An example of a communication unit includes the communication unit 145 depicted in FIG. 1. The remote vehicle is also a connected vehicle, and so, it includes a communication unit. The connected roadway infrastructure device also includes a communication unit.

As used herein, the term “wireless message” refers to a V2X message transmitted by a communication unit of a connected vehicle such as a remote vehicle or the ego vehicle.

The example general method is now described. In some embodiments, one or more steps of the example general method are skipped or modified. The steps of the example general method may be executed in any order, and not necessarily the order presented.

As described, a plurality of the steps may include the notification system of the ego vehicle being executed by a processor of the ego vehicle. In some embodiments, the processor executes the notification one or more times and the notification system executes these steps responsive to the processor executing the notification system these one or more times. Accordingly, in some embodiments the processor executes the notification system fewer or more times than what is described herein.

In some embodiments, a plurality of vehicles on a roadway include instances of the notification system and the notification systems of these vehicles also execute some or all of the steps described below. For example, one or more of these steps are executed by the members of a vehicular micro cloud in some embodiments. In some embodiments, a server such as a cloud server or an edge server includes an instance of the notification system, and one or more steps are executed by the notification system of one or more of these entities.

The steps of the example general method are now described according to some embodiments.

Step 1: The notification system of the ego vehicle is executed by a processor of the ego vehicle. The notification system, when executed by the processor of the ego vehicle, causes the processor to instruct the sensor set of the ego vehicle to record ego sensor data. The ego sensor data includes digital data that describes the sensor measurements of the sensors that are included in the sensor set of the ego vehicle. In some embodiments, the individual sensor measurements are time stamped so an instance of ego sensor data describes both a sensor measurement and when this measurement was recorded. In some embodiments, the ego sensor data includes time data that describes the timestamps for the sensor measurements.

In some embodiments, the sensor measurements described by the ego sensor data describe one or more of the following types of sensor measurements: the ego vehicle over time including its location in a roadway environment over time; the location of the ego vehicle relative to other objects within the roadway environment over time; the driver’s operation of the ego vehicle over time, the presence of other objects over time within the roadway environment that includes the ego vehicle; the location of these objects in the roadway over time relative to other objects (e.g., the location of these other objects relative to one another and relative to the ego vehicle); the behavior of these other objects over time; the geometry of the roadway over time; features in the roadway over time and changes in one or more of their position, velocity, and acceleration; kinematic information about the ego vehicle and/or any objects in the roadway environment; and any aspect of the roadway environment that is measurable by the sensors included in the sensor set of the ego vehicle.

An example of the ego sensor data according to some embodiments includes the ego sensor data 195 depicted in FIG. 1. The sensors included in the sensor set, and the type of measurements they can record, are described in more detail below.

Step 2: (Optional) A set of one or more remote vehicles in sensor range of the ego vehicle include their own instance of the notification system. The notification system of these remote vehicles causes the sensor sets of these remote vehicles to record sensor measurements of their roadway environment. These sensor measurements include sensor measurements similar to those described above for step 1.

The sensor measurements recorded by an individual remote vehicle from the set of remote vehicles is described by remote sensor data. The remote sensor data includes digital data that describes the sensor measurements of the sensors that are included in the sensor set of the remote vehicle. In some embodiments, the individual sensor measurements are time stamped so an instance of remote sensor data describes both a sensor measurement and when this measurement was recorded. In some embodiments, the remote sensor data includes time data that describes the timestamps for the sensor measurements.

In some embodiments, the sensor measurements described by the remote sensor data describe one or more of the following: the remote vehicle over time including its location in a roadway environment over time; the location of the remote vehicle relative to other objects within the roadway environment over time; a driver's operation of the remote vehicle over time, the presence of other objects (including the presence of the ego vehicle) over time within the roadway environment that includes the remote vehicle; the location of these objects (including the location of the ego vehicle) in the roadway over time relative to other objects (e.g., the location of the ego vehicle relative to the remote vehicle as measured from the perspective of the remote vehicle); the behavior of these other objects (including the behavior of the ego vehicle) over time; the geometry of the roadway over time; features in the roadway over time and changes in one or more of their position, velocity, and acceleration; kinematic information about the remote vehicle and/or any objects in the roadway environment; and any aspect of the roadway environment that is measurable by the sensors included in the sensor set of the remote vehicle The sensors included in the sensor sets of the remote vehicles are similar to those included in the ego vehicle.

Step 3: The notification system of the ego vehicle is executed by a processor of the ego vehicle. The notification system, when executed by the processor of the ego vehicle, causes the processor to detect, based on one or more first instances of sensor data, a presence of an adverse driving condition caused by a remote vehicle. The one or more first instances of sensor data includes one or more of the following: ego sensor data recorded by the ego vehicle itself; and remote sensor data recorded by one or more remote vehicles.

In some embodiments, a non-transitory memory of the ego vehicle includes digital data describing object priors or other digital data that is used to detect adverse driving conditions. For example, the object priors describe one or more adverse driving conditions and the notification system compares the one or more first instances of sensor data to the object priors to detect the adverse driving condition. In another example, the notification system compares the one or more first instances of sensor data to the pattern data to detect the adverse driving condition.

Step 4: (Optional) The notification system of the ego vehicle is executed by a processor of the ego vehicle. The notification system, when executed by the processor of the ego vehicle, causes the processor to take steps to form a vehicular micro cloud. In some embodiments, this step is executed responsive to detecting the presence of the adverse driving condition.

Step 5: The notification system of the ego vehicle is executed by a processor of the ego vehicle. The notification system, when executed by the processor of the ego vehicle, causes the processor to take steps to determine one or more of the following: (1) one or more parameters for severity computation based on a sensitivity of a driver of the ego vehicle; and (2) a selected severity equation to use for the severity computation based on the sensitivity of the driver of the ego vehicle.

Sensitivity data includes digital data that describes the sensitivity of the driver. For example, some drivers have a greater sensitivity than others to adverse driving conditions and a corresponding desire to be notified about a broader range of adverse driving conditions when compared to less sensitive drivers, whereas other drivers have a less sensitivity than others to adverse driving conditions and a corresponding desire to be notified about fewer adverse driving conditions when compared to more sensitive drivers. The sensitivity data describes a sensitivity score for the driver of the ego vehicle.

In some embodiments, the sensitivity score starts at a default setting from the factory and is changed over time as the driver provides feedback data to the notification system. Feedback data includes digital data that describes feedback provided by a driver of the ego vehicle responsive to receiving a notification about an adverse driving condition from the notification system. For example, the notification system provides the driver with a notification. The notification is provided via a notification device. The notification device includes one or more of a graphical display device, speaker, haptic motor, or any other device suitable for providing a notification to the driver. Subsequently the notification system requests feedback data from the driver about the notification. For example, the notification system causes a graphical display to display a GUI requesting feedback data from the driver. The feedback data describes whether the driver thinks the notification was helpful or unhelpful. If the notification is indicated as being unhelpful, then the feedback data describes why the notification was unhelpful. Other types of feedback are possible. Based on the feedback data, the notification system generates and updates sensitivity data for the driver of the ego vehicle so that future notifications are aligned with the sensitivity of the driver. For example, one or more severity equations (or their variables, weights, or parameters) are modified based on the sensitivity of the driver as described by their feedback data so that the severity equation is customized based on the sensitivity of the driver. An example of the feedback data according to some embodiments includes the feedback data 157 depicted in FIG. 1.

In some embodiments, a memory of the ego vehicle stores a set of severity equations. A severity equation includes an equation that is operable to determine a severity of an adverse driving condition. Examples of severity equations are depicted in FIG. 8. The output of a severity equation includes a severity score. The severity score is a number that quantifies how severe a particular adverse driving condition is based on the analysis of the severity equation. Different severity equations produce different severity scores. Over time, as more feedback data is received, the notification system is able to identify which severity equation outputs severity scores that are most aligned with the sensitivity of the driver when compared to the output of the other sensitivity equations. Accordingly, selecting a severity equation to use for a severity computation based on the sensitivity of the driver of the ego vehicle includes selecting a severity equation that is most aligned with the sensitivity of the driver as indicated by the feedback data they have previously provided. In this way the selected severity equation is said to be customized based on the sensitivity of the driver according to some embodiments. In some embodiments, the severity equations that are not selected are referred to as "non-selected equations." In some embodiments, the notification system includes a default severity equation that is used until a threshold amount of feedback data is received so that the sensitivity of the driver is understood. The threshold amount of feedback data is described by the threshold data.

Customizing a severity equation based on the sensitivity of a driver is described according to some embodiments. Some severity equations include parameters that are configurable to better align the sensitivity scores outputted by the severity equation to the sensitivity of the driver. For example, the severity equation includes one or more weights assigned to one or more variables and the weights are modified on a per variable basis so that the severity score outputted by the severity equation is more aligned with the sensitivity of the driver when compared to the output of the severity equation prior to this modification. Accordingly, determining one or more parameters for severity computation based on a sensitivity of a driver of the ego vehicle includes modifying one or more parameters of the selected severity equation to be more aligned with the sensitivity of the driver when compared to the output of the severity equation prior to this modification. For example, assume the severity equation includes a variable for increasing the severity score based on swerving drivers traveling behind a driver of an ego vehicle but this driver is less sensitive to such adverse driving conditions, and so, the notification system decreases the weight given to this variable since the driver is less sensitive to such adverse driving conditions.

Step 6: The notification system of the ego vehicle is executed by a processor of the ego vehicle. The notification system, when executed by the processor of the ego vehicle, causes the processor to take steps to determine a first severity of the adverse driving condition based at least in part on the one or more first sensor measurements. For example, the notification system analyzes the digital data available to it to populate the variables of the selected severity equation and executes the severity equation to calculate the severity score for the adverse driving condition.

Figure 4:
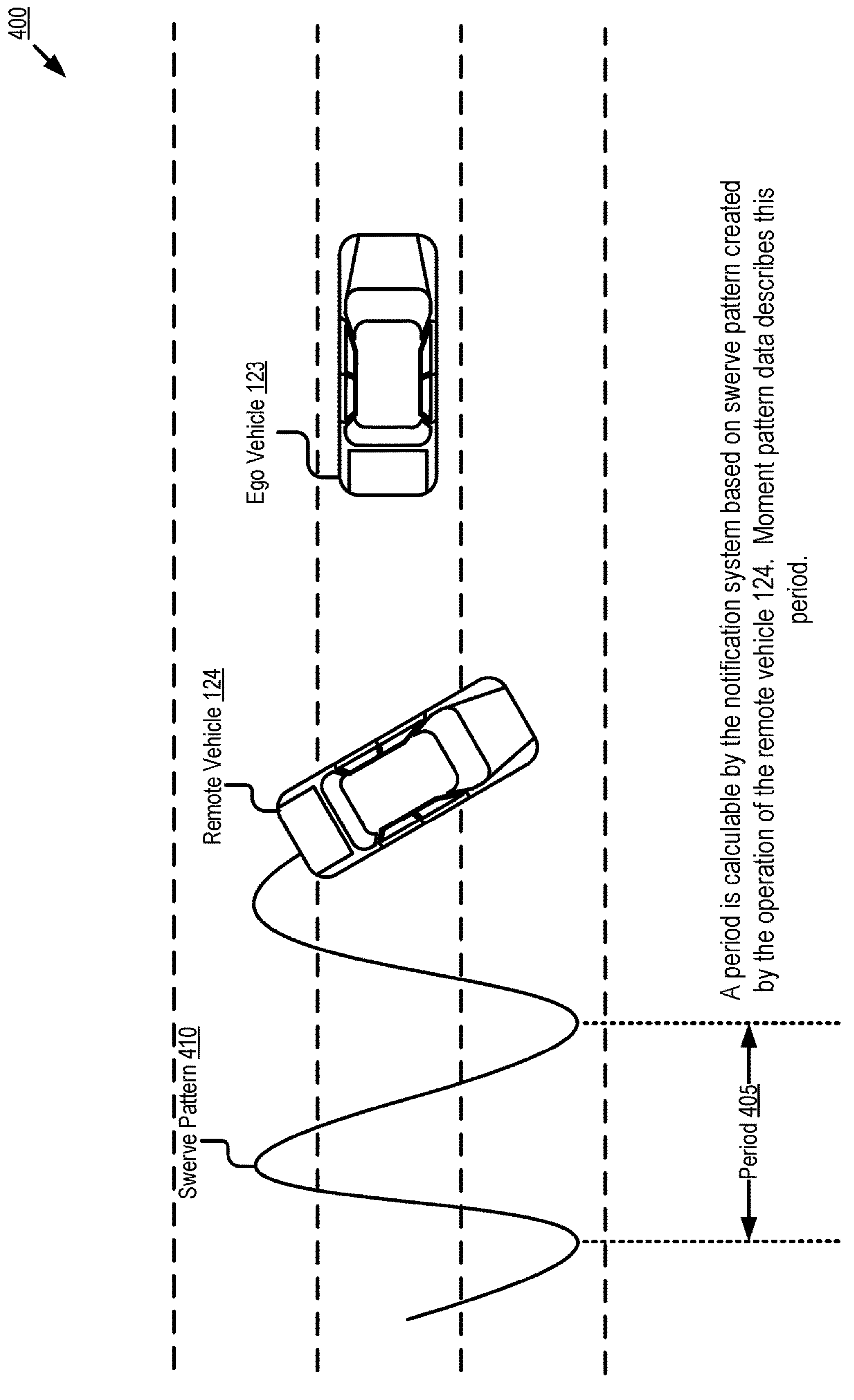
FIG. 4 is a block diagram of an example use case for the notification system according to some embodiments.

In some embodiments, the severity equation includes a variable for moment pattern data or a variable that uses moment pattern data in its calculation. For example, one variable that some severity equations include is $X_{i1}$ which represents "characteristics of unsafe driving." An example of this variable includes moment pattern data. Moment pattern data includes digital data that describes a period of motion of a remote vehicle. For example, FIG. 4 depicts a period 405 of a swerve pattern 410. The swerve described by the swerve pattern 410 is an example of an adverse driving condition for the ego vehicle 123 depicted in FIG. 4. The moment pattern data for this swerve pattern 410 describes the period 405. In some embodiments, the notification system analyzes the measurements included in the sensor data that describe the swerve pattern 410 and calculates the period 405 of the swerve pattern based on these sensor measurements. The period 405 includes a number that describes the period for the swerve pattern 410. FIG. 4 depicts an example of how the period 405 is calculated. The period 405 (i.e., the number that describes the period 405) is inputted as the "characteristics of unsafe driving" variable for the selected severity equation for the driver of the ego vehicle 123. The "characteristics of unsafe driving" variable may include a weight associated with it in the severity equation. For example, if the driver of the ego vehicle 123 is more sensitive to swerving remote vehicles, then the weight selected at step 5 of this example general method (described above) is higher than would be used for drivers less sensitive to swerving remote vehicles. An example of the moment pattern data according to some embodiments includes the moment pattern data 161. The examples included in this paragraph are illustrative and not limiting.

Figure 5:
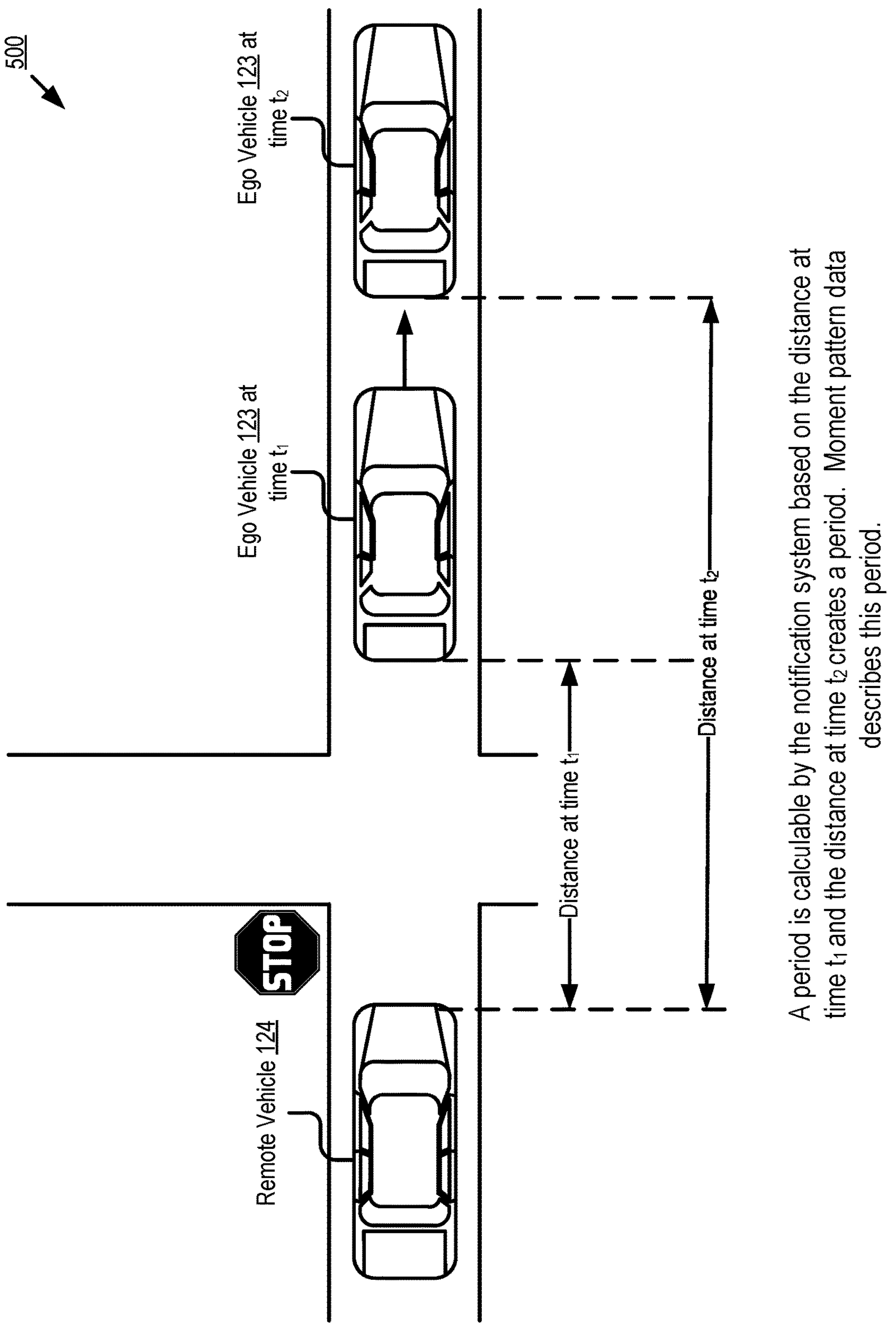
FIG. 5 is a block diagram of an example use case for the notification system according to some embodiments.

FIG. 5 depicts a different example of a moment pattern data whereby the period is caused by a remote vehicle stopping at stop sign so that the distance to collide with an ego vehicle gets greater over time, resulting in a period that is calculable as shown in FIG. 5. This period is described by moment pattern data that is then inputted into a "characteristics of unsafe driving" variable of a selected severity equation. Example of candidate selected severity equations are depicted in FIG. 8 according to some embodiments. Other examples are possible.

In some embodiments, the severity equation includes a variable for environment data or a variable that uses environment data in its calculation. For example, one variable that some severity equations include is $X_{i2}$ which represents "characteristics of surrounding." An example of this variable includes environment data. Environmental data includes digital data that describes characteristics surrounding the ego vehicle that affect the severity of adverse driving characteristics that are also in the surrounding of the ego vehicle. For example, sometimes an adverse driving condition behind an ego vehicle is not sufficiently severe to trigger a notification being provided to the driver of the ego vehicle. However, other remote vehicles that are up-road may be engaged in innocuous behavior that affects the severity of the adverse condition behind the ego vehicle.

Figure 7:
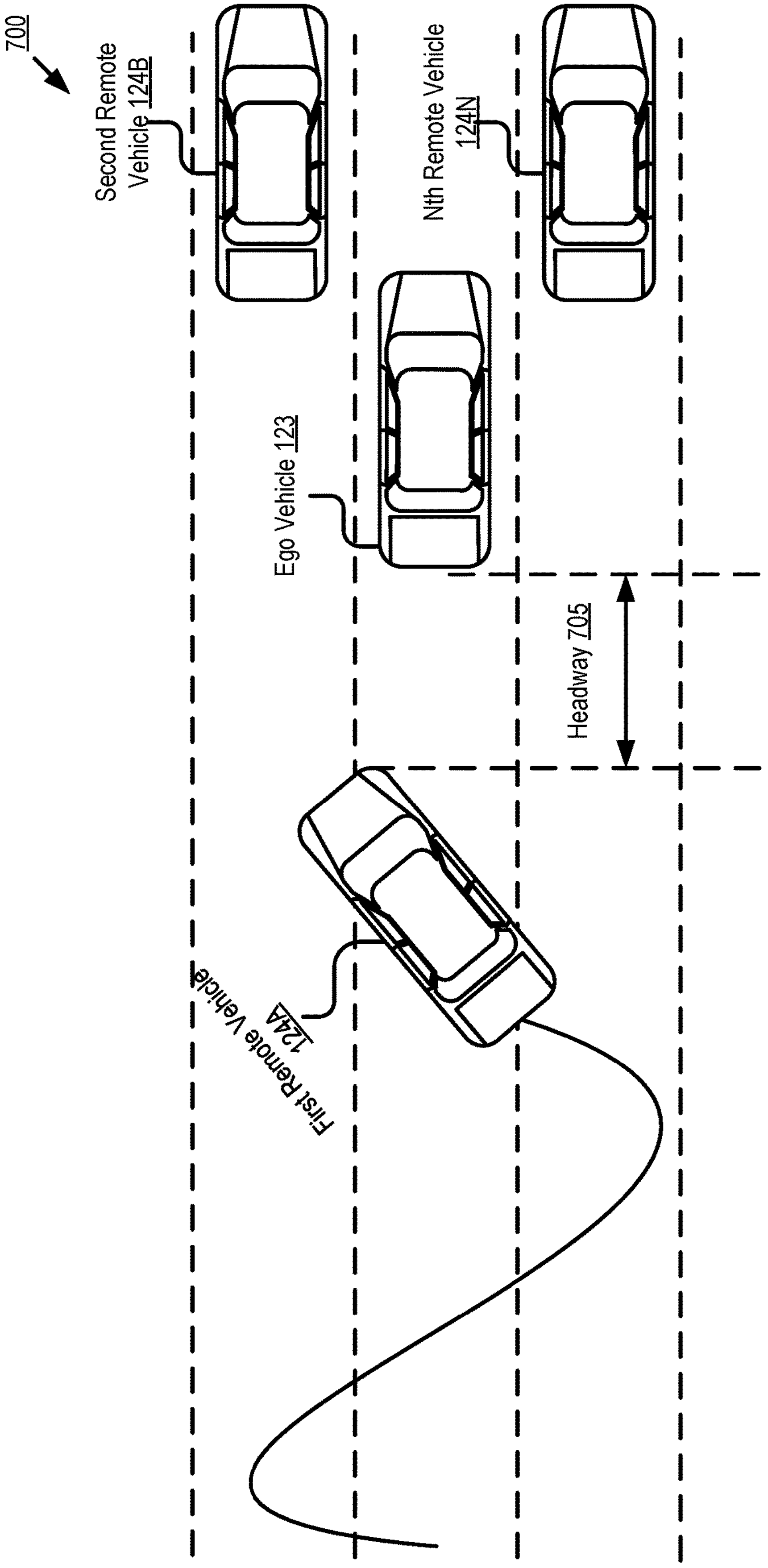
FIG. 7 is a block diagram of an example use case for the notification system according to some embodiments.

An example of this concept is now provided with reference to FIG. 7. The first remote vehicle 124A is swerving. In this example the notification system determines that this is an adverse driving condition. Assume in this example that the period of the swerve pattern caused by the first remote vehicle 124 would not be sufficiently severe to cause the notification system to notify the driver of the ego vehicle about the adverse driving condition. For example, the first remote vehicle 124 is not a threat to the driver sufficient to satisfy a threshold for safety based on the moment pattern of the swerve pattern alone. However, the headway 705 is too small to satisfy a threshold for safety, and the second remote vehicle 124B and the Nth remote vehicle 124N are blocking lanes for the ego vehicle 123 to move to in order to avoid the risk caused by the first remote vehicle 124A swerving.

In this example, the environment data includes digital data that describes the following "characteristics of the surrounding" of the ego vehicle 123: (1) the headway 705 being too small to satisfy a threshold for safety [an example of a characteristic of the roadway behind the ego vehicle 123]; (2) the second remote vehicle 124B driving ahead of the ego vehicle 123 in the far left lane and blocking the ability of the ego vehicle 123 to move to this lane in order to avoid the first remote vehicle 124A [an example of a characteristic of the roadway ahead the ego vehicle 123]; and (3) the Nth remote vehicle 124N driving ahead of the ego vehicle 123 in the far right lane and blocking the ability of the ego vehicle 123 to move to this lane in order to avoid the first remote vehicle 124A [another example of a characteristic of the roadway ahead the ego vehicle 123].

In some embodiments, driving behaviors having a severity score that satisfies a threshold for severity are referred to as "threats" to the driver because they satisfy threshold for severity. In some embodiments, the notification system is configured to notify the driver about such threats but not others. In some embodiments, satisfying the threshold for severity requires an increasing severity trend. In some embodiments, the severity is required to be measured at least two or more times to measure the severity trend in order to satisfy the threshold for severity. In some embodiments, the severity is required to be measured at least N or more times to measure the severity trend in order to satisfy the threshold for severity, where N is any positive whole number greater than two.

In some embodiments, the environment data describes a number that quantifies a contribution to the overall severity of the adverse driving condition that is contributed by the "characteristics of the surrounding" of the ego vehicle 123. The notification system 199 includes code and routines that are operable to generate the environment data using one or more of the AI modeling software, digital twin simulation software, or mathematical modeling software described above.

For example, the notification system 199 inputs the sensor data into the AI modeling software which has been appropriately trained, executes the AI modeling software, and the AI modeling software outputs digital data including, among other things, one or more of the following: analysis data 181 describing the adverse driving condition; moment pattern data 161 describing a moment pattern associated with the adverse driving condition; and environment data 163 that includes a number quantifying the contribution to the overall severity of the adverse driving condition that is contributed by the "characteristics of the surrounding" of the ego vehicle 123. For example, with reference to the preceding four paragraphs and the example they describe with reference to FIG. 7, the environment data outputted by the AI modeling software describes a number that quantifies the contribution to the overall severity of the adverse driving condition that is contributed by one or more of the following: (1) the headway 705 being too small to satisfy a threshold for safety; (2) the second remote vehicle 124B driving ahead of the ego vehicle 123 in the far left lane and blocking the ability of the ego vehicle 123 to move to this lane in order to avoid the first remote vehicle 124A; and (3) the Nth remote vehicle 124N driving ahead of the ego vehicle 123 in the far right lane and blocking the ability of the ego vehicle 123 to move to this lane in order to avoid the first remote vehicle 124A.

Another example of the notification system 199 outputting environment data that describes a number quantifying the contribution to the overall severity of the adverse driving condition that is contributed by the "characteristics of the surrounding" of the ego vehicle 123 is now described according to some embodiments. The notification system 199 inputs the sensor data into the digital twin simulation software, executes the digital twin simulation software, and the digital twin simulation software outputs digital data including, among other things, one or more of the following: analysis data 181 describing the adverse driving condition; moment pattern data 161 describing a moment pattern associated with the adverse driving condition; and environment data 163 that includes a number quantifying the contribution to the overall severity of the adverse driving condition that is contributed by the "characteristics of the surrounding" of the ego vehicle 123. For example, with reference to the preceding five paragraphs and the example they describe with reference to FIG. 7, the environment data outputted by the digital twin simulation software describes a number that quantifies the contribution to the overall severity of the adverse driving condition that is contributed by one or more of the following: (1) the headway 705 being too small to satisfy a threshold for safety; (2) the second remote vehicle 124B driving ahead of the ego vehicle 123 in the far left lane and blocking the ability of the ego vehicle 123 to move to this lane in order to avoid the first remote vehicle 124A; and (3) the Nth remote vehicle 124N driving ahead of the ego vehicle 123 in the far right lane and blocking the ability of the ego vehicle 123 to move to this lane in order to avoid the first remote vehicle 124A.

Yet another example of the notification system 199 outputting environment data that describes a number quantifying the contribution to the overall severity of the adverse driving condition that is contributed by the "characteristics of the surrounding" of the ego vehicle 123 is now described according to some embodiments. The notification system 199 inputs the sensor data into the mathematical modeling software, executes the mathematical modeling software, and the mathematical modeling software outputs digital data including, among other things, one or more of the following: analysis data 181 describing the adverse driving condition; moment pattern data 161 describing a moment pattern associated with the adverse driving condition; and environment data 163 that includes a number quantifying the contribution to the overall severity of the adverse driving condition that is contributed by the "characteristics of the surrounding" of the ego vehicle 123. For example, with reference to the preceding six paragraphs and the example they describe with reference to FIG. 7, the environment data outputted by the mathematical modeling software describes a number that quantifies the contribution to the overall severity of the adverse driving condition that is contributed by one or more of the following: (1) the headway 705 being too small to satisfy a threshold for safety; (2) the second remote vehicle 124B driving ahead of the ego vehicle 123 in the far left lane and blocking the ability of the ego vehicle 123 to move to this lane in order to avoid the first remote vehicle 124A; and (3) the Nth remote vehicle 124N driving ahead of the ego vehicle 123 in the far right lane and blocking the ability of the ego vehicle 123 to move to this lane in order to avoid the first remote vehicle 124A.

Severity equation data includes digital data that describes one or more severity equations. In some embodiments, the severity equation data includes digital data that describes one or more variable and/or parameters that is necessary to calculate a severity score using at least one of the severity equations. A parameter includes, for example, a weight assigned to a variable (e.g., the characteristics of unsafe driving variable, the characteristics of the surrounding variable, etc.). In some embodiments, the severity equation data includes digital data that describes each parameter and each variable that is necessary to calculate severity scores using the one or more severity equations. In some embodiments, the severity equation data includes digital data that describes a set of severity equations. In some embodiments, severity equation data includes digital data that describes, for each severity equation included in the set, which driver sensitivities are most aligned with each severity equation so that the notification system can select severity equations from among the set that are most aligned with the sensitivities of the driver relative to the other severity equations that are included in the set. An example of the severity equation data according to some embodiments includes the severity equation data 159 depicted in FIG. 1.

Step 7: The notification system of the ego vehicle is executed by a processor of the ego vehicle. The notification system, when executed by the processor of the ego vehicle, causes the processor to take steps to determine a second severity of the adverse driving condition at a second time based at least in part on one or more second sensor measurements. In some embodiments, this step includes determining second moment pattern data and second environment data that are used in determining the second severity. In some embodiments, this step is executed in a manner that is similar to step 6 described above, and so, that description will not be repeated here. Step 7 includes a sub-step in which additional sensor data is measured at the second time and this additional sensor data is used to determine the second severity of the adverse driving condition (e.g., the same one previously detected) at the second time.

Step 8: The notification system of the ego vehicle is executed by a processor of the ego vehicle. The notification system, when executed by the processor of the ego vehicle, causes the processor to take steps to analyze the first severity and the second severity to determine if the second severity is increased relative to the first severity. In this way the notification determines whether there is an increasing severity trend present. In some embodiments, step 8 includes a sub-step in which the increasing severity trend is compared to a threshold for increasing severity described by the threshold data to determine whether the threshold is satisfied.

Step 9: The notification system of the ego vehicle is executed by a processor of the ego vehicle. The notification system, when executed by the processor of the ego vehicle, causes the processor to take steps to provide, by a notification device of the ego vehicle, a notification of the adverse driving condition caused by the remote vehicle responsive to the second severity increasing relative to the first severity so that an increasing severity trend is present wherein the notification is not provided if the increasing severity trend is not present. In some embodiments, step 9 is only executed if in step 8 the notification system determines that the threshold for increasing severity is satisfied.

The notification device includes one or more of the following: an electronic display device; a speaker; a haptic motor; and any other device suitable for providing a notification to the driver. An example of the notification device according to some embodiments includes the notification device 206 depicted in FIG. 2. In some embodiments, the notification device includes an electronic display device embedded in a surface of the ego vehicle such as a rear-view mirror, a side mirror, a windshield, etc. In some embodiments, the electronic display device is an element of an infotainment system of the ego vehicle. In some embodiments, the electronic display device is touch sensitive to receive feedback (e.g., feedback data) from the driver of the ego vehicle. In some embodiments, the notification device includes a microphone so that the driver of the ego vehicle can provide feedback using their voice which is received by the microphone which then generates feedback data describing what was spoken by the driver.

In some embodiments, this step includes a sub-step including generating GUI data describing the notification and providing the GUI data to the notification device.

Step 10: The notification system of the ego vehicle is executed by a processor of the ego vehicle. The notification system, when executed by the processor of the ego vehicle, causes the processor to take steps to generate GUI data describing the feedback interface. The feedback interface includes a GUI that includes graphical information requesting the driver's feedback regarding the notification provided at step 9. In some embodiments this step includes generating an audio file to provide to a speaker to ask the driver to provide feedback data instead using a GUI for this same purpose. The subsequent steps assume that the feedback interface is used instead of the audio prompt, but either or both are acceptable.

Step 11: The notification system of the ego vehicle is executed by a processor of the ego vehicle. The notification system, when executed by the processor of the ego vehicle, causes the processor to take steps to provide the GUI data to the notification device or some other interface device.

Step 12: The notification system of the ego vehicle is executed by a processor of the ego vehicle. The notification system, when executed by the processor of the ego vehicle, causes the processor to take steps to cause the notification device to display the feedback interface.

Step 13: The notification system of the ego vehicle is executed by a processor of the ego vehicle. The notification system, when executed by the processor of the ego vehicle, causes the processor to take steps to cause the notification device to receive feedback data (e.g., via a touch screen or microphone) describing feedback from the driver regarding the notification.

Step 14: The notification system of the ego vehicle is executed by a processor of the ego vehicle. The notification system, when executed by the processor of the ego vehicle, causes the processor to take steps to update one or more of the following based on the feedback data: (1) parameters used for the severity computation; and (2) which severity equation is used for the severity computation in the future. In some embodiments this step includes a sub-step of determining or updating the sensitivity data for the driver based on the feedback data. This step beneficially ensures that the severity equation is customized to the sensitivity of the driver and therefore aligned with their sensitivity.

Step 15: The method returns to step 1 again so that the notification system monitors for additional adverse driving conditions or continues to track this adverse driving condition. In some embodiments, the method includes transmitting V2X data to members of a vehicular micro cloud to notify the other members about the presence of the adverse driving condition and the severity trend for this adverse driving condition.

Automaticity

In some embodiments, the ego vehicle 123 is an autonomous vehicle or a semi-autonomous vehicle. In some embodiments, the autonomous driving system or some other vehicle control system of the ego vehicle executes the driving plan.

For example, the ego vehicle 123 includes a set of Advanced Driver Assistance Systems (e.g., a set of vehicle control systems) which provide autonomous features to the ego vehicle 123 which are sufficient to render the ego vehicle 123 an autonomous vehicle. The vehicle control systems include one or more ADAS systems. In some embodiments, an autonomous driving system includes a set of vehicle control systems that collectively or individually provide a set of autonomous driving features that are sufficient to render the ego vehicle a Level 3 autonomous vehicle or higher. An example of the autonomous driving system according to some embodiments includes the autonomous driving system 152 depicted in FIG. 2.

The National Highway Traffic Safety Administration ("NHTSA") has defined different "levels" of autonomous vehicles, e.g., Level 0, Level 1, Level 2, Level 3, Level 4, and Level 5. If an autonomous vehicle has a higher-level number than another autonomous vehicle (e.g., Level 3 is a higher-level number than Levels 2 or 1), then the autonomous vehicle with a higher-level number offers a greater combination and quantity of autonomous features relative to the vehicle with the lower-level number. The different levels of autonomous vehicles are described briefly below.

Level 0: The vehicle control systems installed in a vehicle have no vehicle control. The vehicle control systems may issue warnings to the driver of the vehicle. A vehicle which is Level 0 is not an autonomous or semi-autonomous vehicle.

Level 1: The driver must be ready to take driving control of the autonomous vehicle at any time. The vehicle control systems installed in the autonomous vehicle may provide autonomous features such as one or more of the following: Adaptive Cruise Control (ACC); and Parking Assistance with automated steering and Lane Keeping Assistance (LKA) Type II, in any combination.

Level 2: The driver is obliged to detect objects and events in the roadway environment and respond if the vehicle control systems installed in the autonomous vehicle fail to respond properly (based on the driver's subjective judgement). The vehicle control systems installed in the autonomous vehicle executes accelerating, braking, and steering. The vehicle control systems installed in the autonomous vehicle can deactivate immediately upon takeover by the driver.

Level 3: Within known, limited environments (such as freeways), the driver can safely turn their attention away from driving tasks but must still be prepared to take control of the autonomous vehicle when needed.

Level 4: The vehicle control systems installed in the autonomous vehicle can control the autonomous vehicle in all but a few environments such as severe weather. The driver must enable the automated system (which is comprised of the vehicle control systems installed in the vehicle) only when it is safe to do so. When the automated system is enabled, driver attention is not required for the autonomous vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

A highly autonomous vehicle (HAV) is an autonomous vehicle that is Level 3 or higher.

Accordingly, in some embodiments the ego vehicle 123 is one of the following: a Level 1 autonomous vehicle; a Level 2 autonomous vehicle; a Level 3 autonomous vehicle; a Level 4 autonomous vehicle; a Level 5 autonomous vehicle; and an HAV.

In some embodiments, the vehicle control systems includes one or more of the following ADAS systems: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a LKA system); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or an "ADAS functionality," respectively. The features and functionality provided by these example ADAS systems are also referred to herein as an "autonomous feature" or an "autonomous functionality," respectively.

In some embodiments, system data includes some or all of the digital data described herein. An example of the system data includes the system data 129 depicted in FIG. 1.

In some embodiments, the communication unit of an ego vehicle includes a V2X radio. The V2X radio operates in compliance with a V2X protocol. In some embodiments, the V2X radio is a cellular-V2X radio ("C-V2X radio"). In some embodiments, the V2X radio broadcasts Basic Safety Messages ("BSM" or "safety message" if singular, "BSMs" or "safety messages" if plural). In some embodiments, the safety messages broadcast by the communication unit includes some or all of the system data as its payload. In some embodiments, the system data is included in part 2 of the safety message as specified by the Dedicated Short-Range Communication (DSRC) protocol. In some embodiments, the payload includes digital data that describes, among other things, sensor data that describes a roadway environment that includes the members of the vehicular micro cloud.

As used herein, the term "vehicle" refers to a connected vehicle. For example, the ego vehicle and remote vehicle depicted in FIG. 1 are connected vehicles.

A connected vehicle is a conveyance, such as an automobile, which includes a communication unit that enables the conveyance to send and receive wireless messages via one or more vehicular networks. The embodiments described herein are beneficial for both drivers of human-driven vehicles as well as the autonomous driving systems of autonomous vehicles. For example, the notification system improves the performance of a vehicle control system, which benefits the performance of the vehicle itself by enabling it to operate more safety or in a manner that is more satisfactory to a human driver of the ego vehicle.

In some embodiments, the notification system is software installed in an onboard unit (e.g., an electronic control unit (ECU)) of a vehicle having V2X communication capability. The vehicle is a connected vehicle and operates in a roadway environment with N number of remote vehicles that are also connected vehicles, where N is any positive whole number that is sufficient to satisfy a threshold for forming a vehicular micro cloud. The roadway environment may include one or more of the following example elements: an ego vehicle; N remote vehicles; a connected roadway infrastructure device; a cloud server; and an edge server. The edge server may be an element of a roadside unit. For the purpose of clarity, the N remote vehicles may be referred to herein as the "remote connected vehicle" or the "remote vehicles" and this will be understood to describe N remote vehicles.

In some embodiments, the notification system includes code and routines stored on and executed by a cloud server or an edge server.

The ego vehicle and the remote vehicles may be human-driven vehicles, autonomous vehicles, or a combination of human-driven vehicles and autonomous vehicles. In some embodiments, the ego vehicle and the remote vehicles may be equipped with DSRC equipment such as a GPS unit that has lane-level accuracy and a DSRC radio that is capable of transmitting DSRC messages.

Nano Clouds

In some embodiments, the ego vehicle and some or all of the remote vehicles include their own instance of a notification system. For example, in addition to the ego vehicle, some or all of the remote vehicles include an onboard unit having an instance of the notification system installed therein.

In some embodiments, the ego vehicle and one or more of the remote vehicles are members of a vehicular micro cloud. In some embodiments, the ego vehicle and some, but not all, of the remote vehicles are members of the vehicular micro cloud. In some embodiments, the ego vehicle and some or all of the remote vehicles are members of the same vehicular macro cloud but not the same vehicular micro cloud, meaning that they are members of various vehicular micro clouds that are all members of the same vehicular macro cloud so that they are still interrelated to one another by the vehicular macro cloud. An example of a vehicular micro cloud according to some embodiments includes the vehicular micro cloud 194 depicted in FIG. 1.

In some embodiments multiple instances of the notification system are installed in a group of connected vehicles. In some embodiments, the group of connected vehicles are arranged as a vehicular micro cloud. As described in more detail below, the notification system further organizes the vehicular micro cloud into a set of nano clouds which are each assigned responsibility for completion of a sub-task. Each nano cloud includes at least one member of the vehicular micro cloud so that each nano cloud is operable to complete assigned sub-tasks of a vehicular micro cloud task for the benefit of the members of the vehicular micro cloud.

In some embodiments, a nano cloud includes a subset of a vehicular micro cloud that is organized within the vehicular micro cloud as an entity managed by a hub wherein the entity is organized for the purpose of a completing one or more sub-tasks of a vehicular micro cloud task.

Hub or Hub Vehicle

Vehicular micro clouds are managed by a hub or hub vehicle. In some embodiments, the notification system that executes any method described herein is an element of a hub or a hub vehicle. For example, the vehicular micro cloud formed by the notification system includes a hub vehicle that provides the following example functionality in addition to the functionality of the methods described herein: (1) controlling when the set of member vehicles leave the vehicular micro cloud (i.e., managing the membership of the vehicular micro cloud, such as who can join, when they can join, when they can leave, etc.); (2) determining how to use the pool of vehicular computing resources to complete a set of tasks in an order for the set of member vehicles wherein the order is determined based on a set of factors that includes safety; (3) determining how to use the pool of vehicular computing resources to complete a set of tasks that do not include any tasks that benefit the hub vehicle; and determining when no more tasks need to be completed, or when no other member vehicles are present except for the hub vehicle, and taking steps to dissolve the vehicular micro cloud responsive to such determinations.

The "hub vehicle" may be referred to herein as the "hub." An example of a hub vehicle according to some embodiments includes the ego vehicle 123 depicted in FIG. 1. In some embodiments, the operating environment 100 includes a roadside unit or some other roadway device, and this roadway device is the hub of the vehicular micro cloud.

In some embodiments, the notification system determines which member vehicle from a group of vehicles (e.g., the ego vehicle and one or more remote vehicles) will serve as the hub vehicle based on a set of factors that indicate which vehicle (e.g., the ego vehicle or one of the remote vehicles) is the most technologically sophisticated. For example, the member vehicle that has the fastest onboard computer may be the hub vehicle. Other factors that may qualify a vehicle to be the hub include one or more of the following: having the most accurate sensors relative to the other members; having the most bandwidth relative to the other members; and having the most unused memory relative to the other members. Accordingly, the designation of which vehicle is the hub vehicle may be based on a set of factors that includes which vehicle has: (1) the fastest onboard computer relative to the other members; (2) the most accurate sensors relative to the other members; (3) the most bandwidth relative to the other members or other network factors such having radios compliant with the most modern network protocols; and (4) most available memory relative to the other members.

In some embodiments, the designation of which vehicle is the hub vehicle changes over time if the notification system determines that a more technologically sophisticated vehicle joins the vehicular micro cloud. Accordingly, the designation of which vehicle is the hub vehicle is dynamic and not static. In other words, in some embodiments the designation of which vehicle from a group of vehicles is the hub vehicle for that group changes on the fly if a "better" hub vehicle joins the vehicular micro cloud. The factors described in the preceding paragraph are used to determine whether a new vehicle would be better relative to the existing hub vehicle.

In some embodiments, the hub vehicle includes a memory that stores technical data. The technical data includes digital data describing the technological capabilities of each vehicle included in the vehicular micro cloud. The hub vehicle also has access to each vehicle's sensor data because these vehicles broadcast V2X messages that include the sensor data as the payload for the V2X messages. An example of such V2X messages include Basic Safety Messages (BSMs) which include such sensor data in part 2 of their payload. In some embodiments, the technical data is included in the member data (and/or sensor data) depicted in FIG. 1 which vehicles such as the ego vehicle 123 and the remote vehicle 124 broadcast to one another via BSMs. In some embodiments, the member data also includes the sensor data of the vehicle that transmits the BSM as well as some or all of the other digital data described herein as being an element of the member data.

In some embodiments, the technical data is an element of the sensor data (e.g., the ego sensor data or the remote sensor data) which is included in the vehicular micro cloud data.

A vehicle's sensor data is the digital data recorded by that vehicle's onboard sensor set 126. In some embodiments, an ego vehicle's sensor data includes the sensor data recorded by another vehicle's sensor set 126; in these embodiments, the other vehicle transmits the sensor data to the ego vehicle via a V2X communication such as a BSM or some other V2X communication.

In some embodiments, the technical data is an element of the sensor data. In some embodiments, the vehicles distribute their sensor data by transmitting BSMs that includes the sensor data in its payload and this sensor data includes the technical data for each vehicle that transmits a BSM; in this way, the hub vehicle receives the technical data for each of the vehicles included in the vehicular micro cloud.

In some embodiments, the hub vehicle is whichever member vehicle of a vehicular micro cloud has a fastest onboard computer relative to the other member vehicles.

In some embodiments, the notification system is operable to provide its functionality to operating environments and network architectures that do not include a server. Use of servers is problematic in some scenarios because they create latency. For example, some prior art systems require that groups of vehicles relay all their messages to one another through a server. By comparison, the use of server is an optional feature for the notification system. For example, the notification system is an element of a roadside unit that includes a communication unit 145 but not a server. In another example, the notification system is an element of another vehicle such as one of the remote vehicles 124.

In some embodiments, the operating environment of the notification system includes servers. Optionally, in these embodiments the notification system includes code and routines that predict the expected latency of V2X communications involving serves and then time the transmission of these V2X communications so that the latency is minimized or reduced.

In some embodiments, the notification system is operable to provide its functionality even though the vehicle which includes the notification system does not have a Wi-Fi antenna as part of its communication unit. By comparison, some of the existing solutions require the use of a Wi-Fi antenna in order to provide their functionality. Because the notification system does not require a Wi-Fi antenna in some embodiments, the notification system is able to provide its functionality to more vehicles, including older vehicles without Wi-Fi antennas.

In some embodiments, the notification system includes code and routines that, when executed by a processor, cause the processor to control when a member of the vehicular micro cloud may leave or exit the vehicular micro cloud. This approach is beneficial because it means the hub vehicle has certainty about how much computing resources it has at any given time since it controls when vehicles (and their computing resources) may leave the vehicular micro cloud. The existing solutions do not provide this functionality.

In some embodiments, the notification system includes code and routines that, when executed by a processor, cause the processor to designate a particular vehicle to serve as a hub vehicle responsive to determining that the particular vehicle has sufficient unused computing resources and/or trustworthiness to provide micro cloud services to a vehicular micro cloud using the unused computing resources of the particular vehicle. This is beneficial because it guarantees that only those vehicles having something to contribute to the members of the vehicular micro cloud may join the vehicular micro cloud. In some embodiments, vehicles which the notification system determines are ineligible to participate as members of the vehicular micro cloud are also excluded from providing rides to users as part of the service.

In some embodiments, the notification system manages the vehicular micro cloud so that it is accessible for membership by vehicles which do not have V2V communication capability. This is beneficial because it ensures that legacy vehicles have access to the benefits provided by the vehicular micro cloud. The existing approaches to task completion by a plurality of vehicles do not provide this functionality.

In some embodiments, the notification system is configured so that a particular vehicle (e.g., the ego vehicle) is pre-designated by a vehicle manufacturer to serve as a hub vehicle for any vehicular micro cloud that it joins. The existing approaches to task completion by a plurality of vehicles do not provide this functionality.

The existing solutions generally do not include vehicular micro clouds. Some groups of vehicles (e.g., cliques, platoons, etc.) might appear to be a vehicular micro cloud when they in fact are not a vehicular micro cloud. For example, in some embodiments a vehicular micro cloud requires that all its members share their unused computing resources with the other members of the vehicular micro cloud. Any group of vehicles that does not require all its members to share their unused computing resources with the other members is not a vehicular micro cloud.

In some embodiments, a vehicular micro cloud does not require a server. Accordingly, in some but not all embodiments, any group of vehicles that includes a server or whose functionality incorporates a server is not a vehicular micro cloud as this term is used herein.

In some embodiments, a vehicular micro cloud formed by a notification system is operable to harness the unused computing resources of many different vehicles to perform complex computational tasks that a single vehicle alone cannot perform (e.g., one or more of the example general method, method 300, and method 600) due to the computational limitations of a vehicle's onboard vehicle computer which are known to be limited. Accordingly, any group of vehicles that does harness the unused computing resources of many different vehicles to perform complex computational tasks that a single vehicle alone cannot perform is not a vehicular micro cloud.

In some embodiments, a vehicular micro cloud can include vehicles that are parked, vehicles that are traveling in different directions, infrastructure devices, or almost any endpoint that is within communication range of a member of the vehicular micro cloud.

In some embodiments, the notification system is configured so that vehicles are required to have a predetermined threshold of unused computing resources to become members of a vehicular micro cloud. Accordingly, any group of vehicles that does not require vehicles to have a predetermined threshold of unused computing resources to become members of the group is not a vehicular micro cloud in some embodiments.

In some embodiments, a hub of a vehicular micro cloud (and/or a dominant hub of a plurality of vehicular micro clouds) is pre-designated by a vehicle manufacturer by the inclusion of one a bit or a token in a memory of the vehicle at the time of manufacture that designates the vehicle as the hub of all vehicular micro clouds which it joins. Accordingly, if a group of vehicles does not include a hub vehicle having a bit or a token in their memory from the time of manufacture that designates it as the hub for all groups of vehicles that it joins, then this group is not a vehicular micro cloud in some embodiments.

A vehicular micro cloud is not a V2X network or a V2V network. For example, neither a V2X network nor a V2V network include a cluster of vehicles in a same geographic region that are computationally joined to one another as members of a logically associated cluster that make available their unused computing resources to the other members of the cluster. In some embodiments, any of the steps of a method described herein (e.g., the method 300 depicted in FIG. 3) is executed by one or more vehicles which are working together collaboratively using V2X communications for the purpose of completing one or more steps of the method(s). By comparison, solutions which only include V2X networks or V2V networks do not necessarily include the ability of two or more vehicles to work together collaboratively to complete one or more steps of a method.

In some embodiments, a vehicular micro cloud includes vehicles that are parked, vehicles that are traveling in different directions, infrastructure devices, or almost any endpoint that is within communication range of a member of the vehicular micro cloud. By comparison, a group of vehicles that exclude such endpoints as a requirement of being a member of the group are not vehicular micro clouds according to some embodiments.

In some embodiments, a vehicular micro cloud is operable to complete computational tasks itself, without delegation of these computational tasks to a cloud server, using the onboard vehicle computers of its members; this is an example of a vehicular micro cloud task according to some embodiments. In some embodiments, a group of vehicles which relies on a cloud server for its computational analysis, or the difficult parts of its computational analysis, is not a vehicular micro cloud. Although FIG. 1 depicts a server in an operating environment that includes the notification system, the server is an optional feature of the operating environment. An example of a preferred embodiment of the notification system does not include the server in the operating environment which includes the notification system.

In some embodiments, the notification system enables a group of vehicles to perform computationally expensive tasks that could not be completed by any one vehicle in isolation.

An existing solution to vehicular micro cloud task execution involves vehicle platoons. As explained herein, a platoon is not a vehicular micro cloud and does not provide the benefits of a vehicular micro cloud, and some embodiments of the notification system requires vehicular micro cloud; this distinction alone differentiates the notification system from the existing solutions. The notification system is different from the existing solution for additional reasons. For example, the existing solution that relies on vehicle platooning does not include functionality whereby the members of a platoon are changed among the platoons dynamically during the task execution. As another example, the existing solution does not consider the task properties, road geometry, actual and/or predicted traffic information and resource capabilities of vehicles to determine the number of platoons. The existing solution also does not include functionality whereby platoons swap which task or sub-task they are performing among themselves while the tasks or sub-tasks are still being performed by the platoons in parallel. The existing solution also does not include functionality whereby platoons are re-organized based on monitored task executions results/performance and/or available vehicles and resources. As described herein, the notification system includes code and routines that provide, among other things, all of this functionality which is lacking in the existing solution.

Vehicle Control System

Modern vehicles include Advanced Driver Assistance Systems (ADAS systems) or automated driving systems. These systems are referred to herein collectively or individually as "vehicle control systems." An automated driving system includes a sufficient number of ADAS systems so that the vehicle which includes these ADAS systems is rendered autonomous by the benefit of the functionality received by the operation of the ADAS systems by a processor of the vehicle. An example of a vehicle control system according to some embodiments includes the vehicle control system 153 depicted in FIGS. 1 and 2.

A particular vehicle that includes these vehicle control systems is referred to herein as an "ego vehicle" and other vehicles in the vicinity of the ego vehicle as "remote vehicles." As used herein, the term "vehicle" includes a connected vehicle that includes a communication unit and is operable to send and receive V2X communications via a wireless network (e.g., the network 105 depicted in FIG. 1).

Modern vehicles collect a lot of data describing their environment, in particular image data. An ego vehicle uses this image data to understand their environment and operate their vehicle control systems (e.g., ADAS systems or automated driving systems).

As automated vehicles and ADAS systems become increasingly popular, it is important that vehicles have access to the best possible digital data that describes their surrounding environment. In other words, it is important for modern vehicles to have the best possible environmental perception abilities.

Vehicles perceive their surrounding environment by having their onboard sensors record sensor measurements and then analyzing the sensor data to identify one or more of the following: which objects are in their environment; where these objects are located in their environment; and various measurements about these objects (e.g., speed, heading, path history, etc.). This invention is about helping vehicles to have the best possible environmental perception abilities.

Vehicles use their onboard sensors and computing resources to execute perception algorithms that inform them about the objects that are in their environment, where these objects are located in their environment, and various measurements about these objects (e.g., speed, heading, path history, etc.).

Cellular Vehicle to Everything (C-V2X)

C-V2X is an optional feature of the embodiments described herein. Some of the embodiments described herein utilize C-V2X communications. Some of the embodiments described herein do not utilize C-V2X communications. For example, the embodiments described herein utilize V2X communications other than C-V2X communications. C-V2X is defined as 3GPP direct communication (PC5) technologies that include LTE-V2X, 5G NR-V2X, and future 3GPP direct communication technologies.

Dedicated Short-Range Communication (DSRC) is now introduced. A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, instances of the term "DSRC" as used herein may be replaced by the term "C-V2X." For example, the term "DSRC radio" is replaced by the term "C-V2X radio," the term "DSRC message" is replaced by the term "C-V2X message," and so on.

In some embodiments, instances of the term "V2X" as used herein may be replaced by the term "C-V2X."

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication-Physical layer using microwave at 5.8 GHZ (review); EN 12795:2002 Dedicated Short-Range Communication (DSRC)-DSRC Data link layer: Medium Access and Logical Link Control (review); EN 12834:2002 Dedicated Short-Range Communication-Application layer (review); and EN 13372:2004 Dedicated Short-Range Communication (DSRC)-DSRC profiles for RTTT applications (review); EN ISO 14906:2004 Electronic Fee Collection-Application interface.

A DSRC message is not any of the following: a WiFi message; a 3G message; a 4G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHZ. In another example, in Europe and Asia, key fobs for remote keyless systems include a short-range radio transmitter which operates at 433.92 MHZ, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides GPS data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

GPS data includes digital data describing the location information outputted by the GPS unit.

In some embodiments, the connected vehicle described herein, and depicted in FIG. 1, includes a V2X radio instead of a DSRC radio. In these embodiments, all instances of the term DSRC" as used in this description may be replaced by the term "V2X." For example, the term "DSRC radio" is replaced by the term "V2X radio," the term "DSRC message" is replaced by the term "V2X message," and so on.

75 MHz of the 5.9 GHz band may be designated for DSRC. However, in some embodiments, the lower 45 MHz of the 5.9 GHz band (specifically, 5.85-5.895 GHz) is reserved by a jurisdiction (e.g., the United States) for unlicensed use (i.e., non-DSRC and non-vehicular related use) whereas the upper 30 MHz of the 5.9 GHz band (specifically, 5.895-5.925 GHZ) is reserved by the jurisdiction for Cellular Vehicle to Everything (C-V2X) use. In these embodiments, the V2X radio depicted in FIG. 1 is a C-V2X radio which is operable to send and receive C-V2X wireless messages on the upper 30 MHz of the 5.9 GHz band (i.e., 5.895-5.925 GHZ). In these embodiments, the notification system 199 is operable to cooperate with the C-V2X radio and provide its functionality using the content of the C-V2X wireless messages.

In some of these embodiments, some or all of the digital data depicted in FIG. 1 is the payload for one or more C-V2X messages. In some embodiments, the C-V2X message is a BSM.

Vehicular Network

In some embodiments, the notification system utilizes a vehicular network. A vehicular network includes, for example, one or more of the following: V2V; V2X; vehicle-to-network-to-vehicle (V2N2V); vehicle-to-infrastructure (V2I); C-V2X; any derivative or combination of the networks listed herein; and etc.

In some embodiments, the notification system includes software installed in an onboard unit of a connected vehicle. This software is the "notification system" described herein.

An example operating environment for the embodiments described herein includes an ego vehicle, one or more remote vehicles, and a recipient vehicle. The ego vehicle the remote vehicle are connected vehicles having communication units that enable them to send and receive wireless messages via one or more vehicular networks. In some embodiments, the recipient vehicle is a connected vehicle. In some embodiments, the ego vehicle and the remote vehicle include an onboard unit having a notification system stored therein.

Some of the embodiments described herein include a server. However, some of the embodiments described herein do not include a server. A serverless operating environment is an operating environment which includes at least one notification system and does not include a server.

Figure 3:
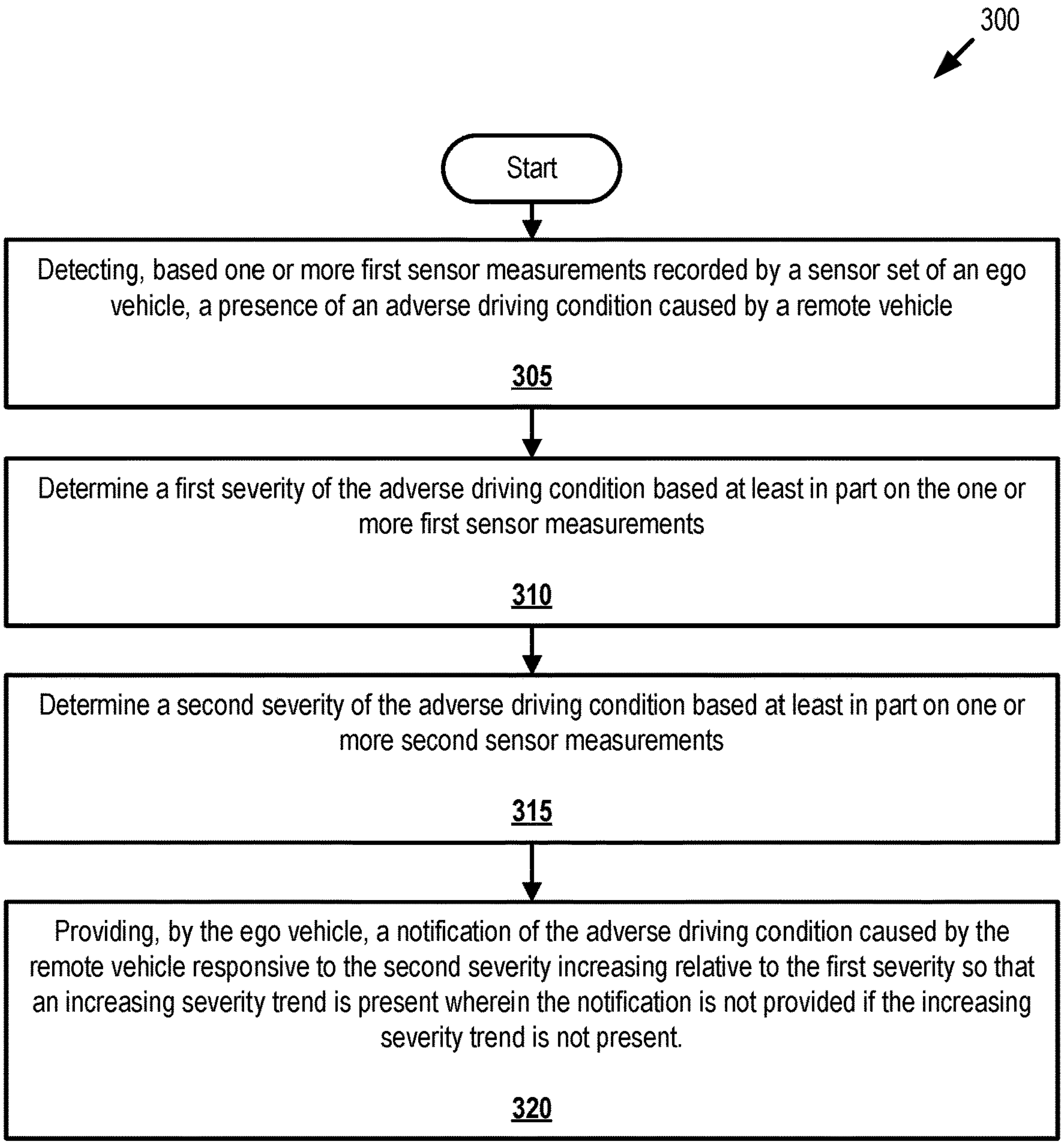
FIG. 3 is a flowchart of an example method for reducing false positive notifications according to some embodiments.
Figure 6A:
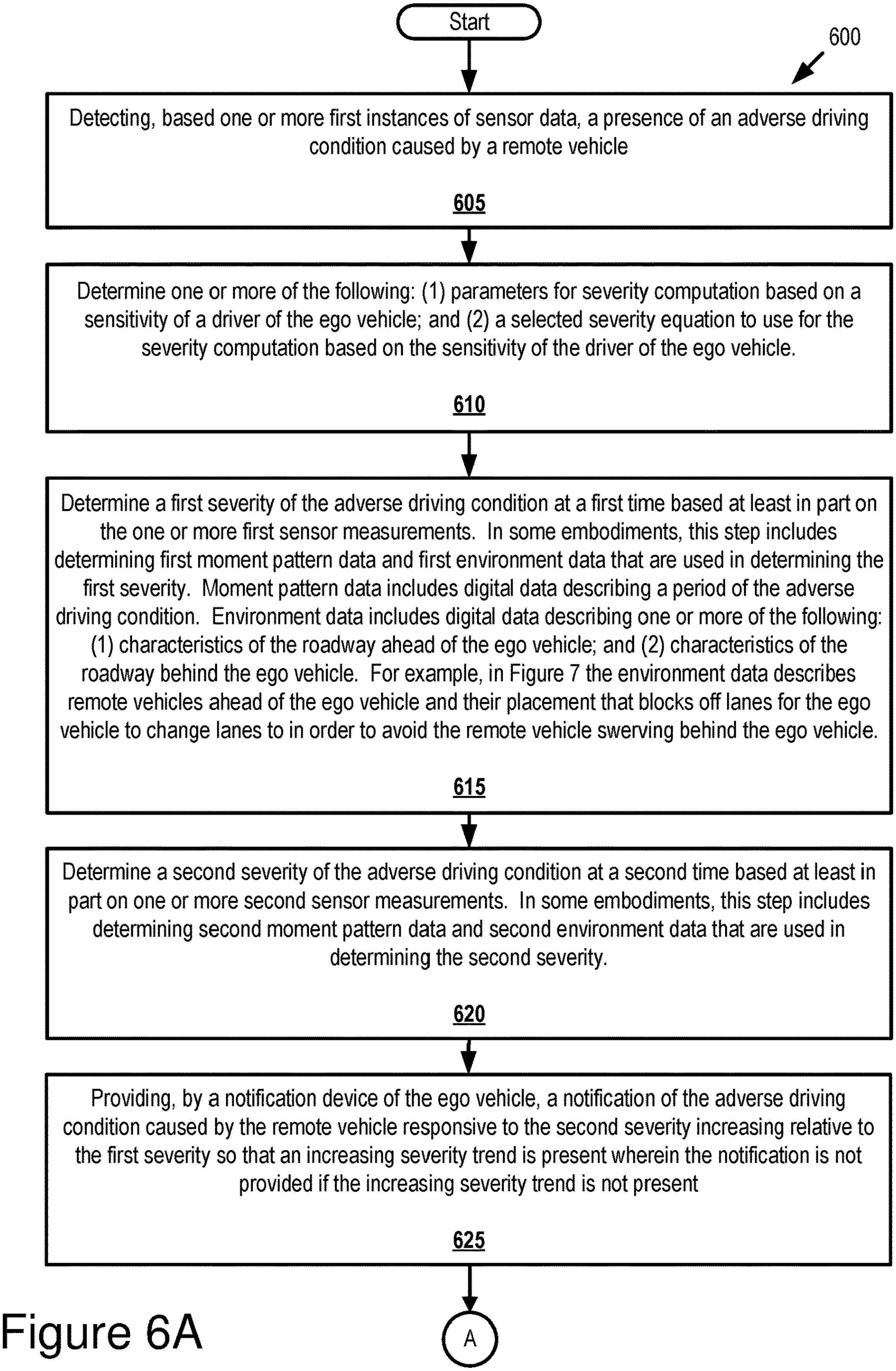
FIGS. 6A and 6B are a flowchart of an example method for reducing false positive notifications according to some embodiments.
Figure 6B:
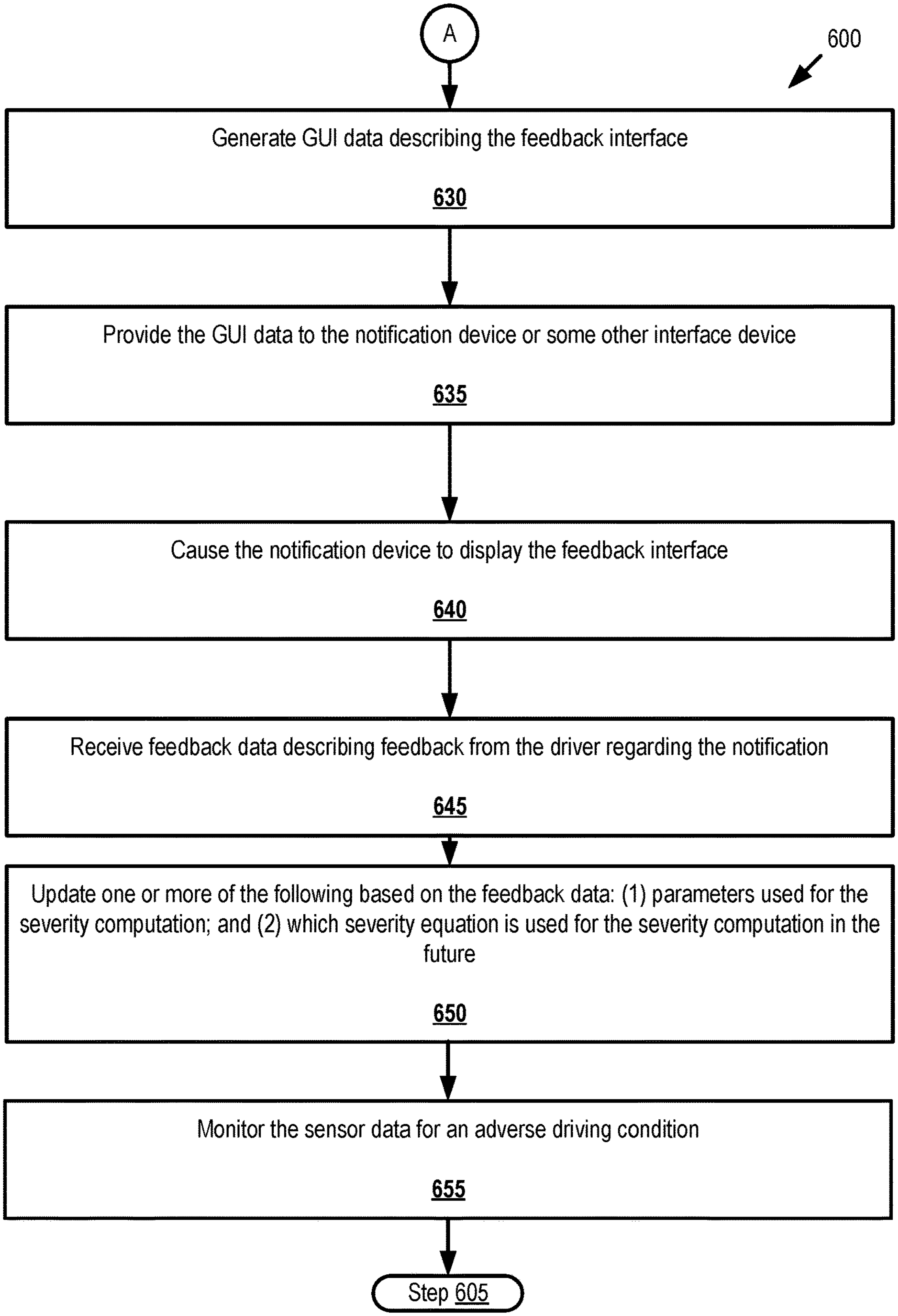

In some embodiments, the notification system includes code and routines that are operable, when executed by a processor of the onboard unit, to cause the processor to execute one or more of the steps of the method 300 depicted in FIG. 3, the method 600 depicted in FIGS. 6A and 6B, or any other method described herein (e.g., the example general method).

This patent application is related to U.S. patent application Ser. No. 15/644,197 filed on Jul. 7, 2017, and entitled "Computation Service for Mobile Nodes in a Roadway Environment," the entirety of which is hereby incorporated by reference. This patent application is also related to U.S. patent application Ser. No. 16/457,612 filed on Jun. 28, 2019, and entitled "Context System for Providing Cyber Security for Connected Vehicles," the entirety of which is hereby incorporated by reference.

Example Overview

In some embodiments, the notification system is software that is operable, when executed by a processor, to cause the processor to execute one or more of the methods described herein. An example operating environment 100 for the notification system is depicted in FIG. 1.

In some embodiments, the notification system 199 is software installed in an onboard unit (e.g., an electronic control unit (ECU)) of a particular make of vehicle having V2X communication capability. For example, the ego vehicle 123 includes a communication unit 145. The communication unit 145 includes a V2X radio. For example, the communication unit 145 includes a C-V2X radio. FIG. 1 depicts an example operating environment 100 for the notification system 199 according to some embodiments.

A connected vehicle is a vehicle having V2X communication capability. For example, a connected vehicle is a vehicle having a communication unit 145. The ego vehicle 123 is a connected vehicle. In some embodiments, the remote vehicle 124 is a connected vehicle. In some embodiments, the remote vehicle 124 is not a connected vehicle.

Example Operative Environment

Embodiments of the notification system are now described. Referring now to FIG. 1, depicted is a block diagram illustrating an operating environment 100 for a notification system 199 according to some embodiments. The operating environment 100 is present in a roadway environment 140. In some embodiments, each of the elements of the operating environment 100 are present in the same roadway environment 140 at the same time. In some embodiments, some of the elements of the operating environment 100 are not present in the same roadway environment 140 at the same time.

The roadway environment 140 includes objects. Examples of objects include one or of the following: other automobiles, road surfaces; signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

The operating environment 100 may include one or more of the following elements: an ego vehicle 123 (referred to herein as a "vehicle 123" or an "ego vehicle 123") (which has a driver 109 in embodiments where the ego vehicle 123 is not at least a Level 3 autonomous vehicle); a remote vehicle 124 (which has a driver similar to the driver 109 in embodiments where the remote vehicle 124 is not at least a Level 3 autonomous vehicle); a connected roadway infrastructure device 141; a cloud server 103; and an edge server 198. These elements are communicatively coupled to one another via a network 105. These elements of the operating environment 100 are depicted by way of illustration. In practice, the operating environment 100 may include one or more of the elements depicted in FIG. 1. For example, although only two vehicles 123, 124 are depicted in FIG. 1, in practice the operating environment 100 can include a plurality of one or more of these elements.

In some embodiments, one or more of the ego vehicle 123, the remote vehicle 124, the connected roadway infrastructure device 141 (optional), the edge server 198 (optional), and the network 105 are elements (e.g., members) of a vehicular micro cloud 194. The operating environment 100 includes a plurality of vehicular micro clouds 194 as depicted in FIG. 1. In some embodiments, the operating environment 100 also includes a plurality of remote vehicles 124. These remote vehicles 124 may be the same or different from one another. In some embodiments, one or more of these elements are members of one or more of the plurality of vehicular micro clouds 194 after their formation; the memberships of the ego vehicle 123, the one or more remote vehicles 124, and the other entities (optional) in the plurality of vehicular micro clouds 194 may or may not be similar.

In some embodiments, two or more of the ego vehicle 123, the remote vehicle 124, and the connected roadway infrastructure device 141 include similar elements. For example, each of these elements of the operating environment 100 include their own processor 125, bus 121, memory 127, communication unit 145, processor 125, sensor set 126, onboard unit 139 (but not the connected roadway infrastructure device 141), and notification system 199. These elements of the ego vehicle 123, the remote vehicle 124, and the connected roadway infrastructure device 141 provide the same or similar functionality regardless of whether they are included in the ego vehicle 123, the remote vehicle 124, or the connected roadway infrastructure device 141. Accordingly, the descriptions of these elements will not be repeated in this description for each of the ego vehicle 123, the remote vehicle 124, and the connected roadway infrastructure device 141.

In the depicted embodiment, the ego vehicle 123, the remote vehicle 124, and the connected roadway infrastructure device 141 store similar digital data. The system data 129 includes digital data that describes some or all of the digital data stored in the memory 127 or otherwise described herein. The connected roadway infrastructure device 141 is an optional feature and is not necessary for the notification system 199 to provide its functionality in some embodiments.

In some embodiments, the one or more of the vehicular micro clouds 194 are a stationary vehicular micro cloud such as described by U.S. patent application Ser. No. 15/799,964 filed on Oct. 31, 2017, and entitled "Identifying a Geographic Location for a Stationary Micro-Vehicular Cloud," the entirety of which is herein incorporated by reference. In some embodiments, one or more of the vehicular micro clouds 194 is a mobile vehicular micro cloud. For example, one or more of the ego vehicle 123, the remote vehicle 124, and the connected roadway infrastructure device 141 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, the vehicular micro cloud 194 is a vehicular micro cloud such as the one described in U.S. patent application Ser. No. 15/799,963 filed on Oct. 31, 2017, and entitled "Identifying a Geographic Location for a Stationary Micro-Vehicular Cloud."

In some embodiments, the vehicular micro cloud 194 includes a dynamic vehicular micro cloud. In some embodiments, the vehicular micro cloud 194 includes an interdependent vehicular micro cloud. In some embodiments, the vehicular micro cloud 194 is sub-divided into a set of nano clouds.

As described above, in some embodiments operating environment 100 includes a plurality of vehicular micro clouds 194. For example, the operating environment 100 includes a first vehicular micro cloud and a second vehicular micro cloud. The operating environment 100 can include any positive whole number of vehicular micro clouds 194 that is greater than one.

Vehicular micro clouds are an optional component of the operating environment 100. In some embodiments, the operating environment 100 does not include a vehicular micro cloud 194. The notification system 199 does not require a vehicular micro cloud 194 to provide its functionality.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the connected roadway infrastructure device 141, the edge server 198, etc.) which has completed a process to join the vehicular micro cloud 194 (e.g., a handshake process with the coordinator of the vehicular micro cloud 194). The cloud server 103 is excluded from membership in the vehicular micro cloud 194 in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

The member data 171 also describes the digital data described above with reference to a dominant hub and the example general method.

In some embodiments, the vehicular micro cloud 194 does not include a hardware server. Accordingly, in some embodiments the vehicular micro cloud 194 may be described as serverless.

In some embodiments, the vehicular micro cloud 194 includes a hardware server. For example, in some embodiments the vehicular micro cloud 194 includes the cloud server 103.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VOLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network. In some embodiments, the network 105 is a C-V2X network.

In some embodiments, the network 105 is an element of the vehicular micro cloud 194. Accordingly, the vehicular micro cloud 194 is not the same thing as the network 105 since the network is merely a component of the vehicular micro cloud 194. For example, the network 105 does not include member data. The network 105 also does not include a hub vehicle.

In some embodiments, one or more of the ego vehicle 123 and the remote vehicle 124 are C-V2X equipped vehicles. For example, the ego vehicle 123 includes a standard-compliant GPS unit that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is a hardware radio that includes a C-V2X receiver and a C-V2X transmitter. The C-V2X radio is operable to wirelessly send and receive C-V2X messages on a band that is reserved for C-V2X messages.

The ego vehicle 123 includes a car, a truck, a sports utility vehicle, a bus, a semi-truck, a drone, or any other roadway-based conveyance. In some embodiments, the ego vehicle 123 includes an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

In some embodiments, the ego vehicle 123 is operable to be placed in "drone mode" which enables the ego vehicle 123 to be operated by a remote device such as the cloud server 103 or the edge server 198 in order to execute a driving plan responsive to the adverse driving condition. When in drone mode the driving interface of the ego vehicle 123 is disengaged so that any input to the driving interface is not operable to control the operation of the ego vehicle 123. Instead, the operation of the ego vehicle 123 is controlled remotely by the remote device which is itself operated by one or more of a human, software, and a combination of a human and software. In this way, the ego vehicle 123 is operable to be driven by a remote source, i.e., the remote device.

For example, a remote device (e.g., the connected roadway infrastructure device 141, the edge server 198, the cloud server 103, etc.) provides wireless messages that include commands that are operable to control the operation of the ego vehicle 123 via the network 105. The communication unit 145 receives the wireless messages via the network 105. The notification system 199 of the ego vehicle 123 parses out the commands from the wireless messages and transmits them to the vehicle control system 153 of the ego vehicle 123. The vehicle control system 153 then controls the operation of the ego vehicle 123 consistent with these commands so that the driving plan is executed. This process is repeated as more wireless messages including authenticated commands are received via the network 105.

The ego vehicle 123 includes one or more of the following elements: a processor 125; a sensor set 126; a vehicle control system 153; a communication unit 145; an onboard unit 139; a memory 127; and a notification system 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the notification system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The ego sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record ego sensor data 195. The ego sensor data 195 includes digital data that describes images or other measurements of the physical environment such as the conditions, objects, and other vehicles present in the roadway environment. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

The physical environment may include a roadway region, parking lot, or parking garage that is proximate to the ego vehicle 123. In some embodiments, the roadway environment 140 includes a roadway that includes a roadway region. The ego sensor data 195 may describe measurable aspects of the physical environment. In some embodiments, the physical environment is the roadway environment 140. As such, in some embodiments, the roadway environment 140 includes one or more of the following: a roadway region that is proximate to the ego vehicle 123; a parking lot that is proximate to the ego vehicle 123; a parking garage that is proximate to the ego vehicle 123; the conditions present in the physical environment proximate to the ego vehicle 123; the objects present in the physical environment proximate to the ego vehicle 123; and other vehicles present in the physical environment proximate to the ego vehicle 123; any other tangible object that is present in the real-world and proximate to the ego vehicle 123 or otherwise measurable by the sensors of the sensor set 126 or whose presence is determinable from the digital data stored on the memory 127. An item is "proximate to the ego vehicle 123" if it is directly measurable by a sensor of the ego vehicle 123 or its presence is inferable and/or determinable by the notification system 199 based on analysis of the ego sensor data 195 which is recorded by the ego vehicle 123 and/or one or more members of the vehicular micro cloud 194.

In some embodiments, the ego sensor data 195 includes digital data that describes all of the sensor measurements recorded by the sensor set 126 of the ego vehicle.

For example, the ego sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

In some embodiments, the sensors of the sensor set 126 are operable to collect ego sensor data 195. The sensors of the sensor set 126 include any sensors that are necessary to measure and record the measurements described by the ego sensor data 195. In some embodiments, the ego sensor data 195 includes any sensor measurements that are necessary to generate the other digital data stored by the memory 127. In some embodiments, the ego sensor data 195 includes digital data that describes any sensor measurements that are necessary for the notification system 199 provides its functionality as described herein with reference to one or more of the method 300 depicted in FIG. 3, the method 600 depicted in FIGS. 6A and 6B, and the example general method described herein.

In some embodiments, the sensor set 126 includes any sensors that are necessary to record ego sensor data 195 that describes the roadway environment 140 in sufficient detail to create a digital twin of the roadway environment 140. In some embodiments, the notification system 199 generates the set of nano clouds and assigns sub-tasks to the nano clouds based on the outcomes observed by the notification system 199 during the execution of a set of digital twins that simulate the real-life circumstances of the ego vehicle 123.

In some embodiments the notification system 199 includes simulation software (e.g., digital twin simulation software). The simulation software is any simulation software that is capable of simulating an execution of a vehicular micro cloud task. For example, the simulation software is operable simulate the notification system 199 providing its functionality to generate some or all of the system data 129. In some embodiments, the simulation software is operable to determine the output of any step, analysis, or process described herein.

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment.

In some embodiments, the simulation software is integrated with the notification system 199. In some other embodiments, the simulation software is a standalone software that the notification system 199 can access to execute digital twin simulations. In some embodiments, the notification system 199 uses the digital twin simulations to determine one or more of the following: analysis data 181; pattern data 183; threshold data 196; moment pattern data 161; environment data 163; system data 129, and variable and/or parameters for severity equations. For example, the notification system 199 uses digital twin simulations to provide some of all of the following functionality: identifying adverse driving conditions; predicting future driving maneuvers; predicting future adverse driving conditions; determine parameters and/or variables for severity equations; determining how to identify adverse driving conditions (e.g., generate a rule set, object priors, etc.); determining driving plans responsive to adverse driving conditions; determining an optimal time for providing a notification to a driver responsive to specific adverse driving conditions; and any other functionality described herein.

Digital twin data 162 includes any digital data, software, and/or other information that is necessary to execute the digital twin simulations. In some embodiments, the digital twin data 162 includes any digital data that is necessary for the notification system 199 to provide its functionality using digital twin simulations as described herein.

Digital twins, and an example process for generating and using digital twins which is implemented by the notification system 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

The ego sensor data 195 includes digital data that describes any measurement that is taken by one or more of the sensors of the sensor set 126. In some embodiments, the ego sensor data 195 includes any sensor measurement that is necessary for the notification system 199 to provide its functionality.

The standard-compliant GPS unit includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes. In some embodiments, the standard-compliant GPS unit is an element of the sensor set 126.

An example of an attribute for GPS data is accuracy. In some embodiments, the standard-compliant GPS unit is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit is compliant with one or more standards governing V2X communications but does not provide GPS measurements that are lane-level accurate.

In some embodiments, the standard-compliant GPS unit includes any hardware and software necessary to make the ego vehicle 123 or the standard-compliant GPS unit compliant with one or more of the following standards governing V2X communications, including any derivative or fork thereof: EN 12253:2004 Dedicated Short-Range Communication-Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection-Application interface.

In some embodiments, the standard-compliant GPS unit is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit.

An example process for generating GPS data describing a geographic location of an object (e.g., a vehicle, a roadway object, an object of interest, a remote vehicle 124, the ego vehicle 123, or some other tangible object or construct located in a roadway environment 140) is now described according to some embodiments. In some embodiments, the notification system 199 include code and routines that are operable, when executed by the processor 125, to cause the processor to: analyze (1) GPS data describing the geographic location of the ego vehicle 123 and (2) ego sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the notification system 199 described herein may analyze the GPS data provided by the standard-compliant GPS unit and determine what lane the ego vehicle 123 is traveling in based on the relative positions of two or more different vehicles (one of which is, for example, the ego vehicle 123) traveling on a roadway at the same time.

By comparison to the standard-compliant GPS unit, a conventional GPS unit which is not compliant with the DSRC standard is unable to determine the location of a vehicle (e.g., the ego vehicle 123) with lane-level accuracy. For example, a typical roadway lane is approximately three meters wide. However, a conventional GPS unit only has an accuracy of plus or minus 10 meters relative to the actual location of the ego vehicle 123. As a result, such conventional GPS units are not sufficiently accurate to enable the notification system 199 to determine the lane of travel of the ego vehicle 123. This measurement improves the accuracy of the GPS data describing the location of lanes used by the ego vehicle 123 when the notification system 199 is providing its functionality.

In some embodiments, the standard-compliant GPS unit enables the notification system 199 to calculate more accurate routes as described by the driving plan.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the ego sensor data 195. For example, the standard-compliant GPS unit is a sensor included in the sensor set 126 and the GPS data is an example type of ego sensor data 195.

In some embodiments, the notification system 199 causes an electronic display of the ego vehicle 123 to display a message describing information relating to the functionality provided by the notification system 199. GUI data 187 includes digital data that describes the GUI that includes the message. The notification system 199 generates and outputs the GUI data 187.

In some embodiments, the GUI is displayed on an electronic display (not depicted) of the ego vehicle 123. An example of the electronic display according to some embodiments includes the notification device 206 depicted in FIG. 2. In some embodiments, the notification system 199 is communicatively coupled to the electronic display to provide the GUI data 187 to the electronic display and control the operation of the electronic display to display the GUI. In some embodiments, the electronic display is a touchscreen that is also operated to receive inputs from the occupant of the ego vehicle 123 (e.g., feedback data 157).

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device. In some embodiments, the notification system 199 is operable to control all or some of the operation of the communication unit 145.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network

105 or other communication channels using one or more wireless communication methods, including: IEEE 802.11; IEEE 802.16, BLUETOOTH®; EN ISO 14906:2004 Electronic Fee Collection-Application interface EN 11253:2004 Dedicated Short-Range Communication-Physical layer using microwave at 5.8 GHz (review); EN 12795:2002 Dedicated Short-Range Communication (DSRC)-DSRC Data link layer: Medium Access and Logical Link Control (review); EN 12834:2002 Dedicated Short-Range Communication-Application layer (review); EN 13372:2004 Dedicated Short-Range Communication (DSRC)-DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369,262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHZ). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the notification system 199.

In some embodiments, the V2X radio includes a DSRC transmitter and a DSRC receiver. The DSRC transmitter is operable to transmit and broadcast DSRC messages over the 5.9 GHz band. The DSRC receiver is operable to receive DSRC messages over the 5.9 GHZ band. In some embodiments, the DSRC transmitter and the DSRC receiver operate on some other band which is reserved exclusively for DSRC.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with the DSRC standards or any other wireless communication standard that applies to wireless vehicular communications. In some embodiments, the standard-compliant GPS unit (not pictured) is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 may store any or all of the digital data or information described herein.

As depicted in FIG. 1, the memory 127 stores the following digital data: the threshold data 196; the member data 171; the digital twin data 162; the vehicular micro cloud data 133; the GPS data (as an element of the ego sensor data 195); the analysis data 181; the GUI data 187; the remote sensor data 193; the ego sensor data 195; the AI model data 155; the feedback data 157; the severity equation data 159; the moment pattern data 161; the environment data 163; and the mathematical model data 165. The system data 129 includes some or all of this digital data. In some embodiments, the V2X messages (or C-V2X messages or the set of wireless messages) described herein are also stored in the memory 127. The above-described elements of the memory 127 were described above, and so, those descriptions will not be repeated here.

Some or all of this digital data can be organized in a data structure that is stored in the memory 127 in some embodiments.

In some embodiments, the ego vehicle 123 includes a vehicle control system 153. A vehicle control system 153 includes one or more ADAS systems or an autonomous driving system.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness notification system; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle. An example of the autonomous driving system according to some embodiments includes the autonomous driving system 152 depicted in FIG. 2.

An autonomous driving system includes a set of ADAS systems whose operation render sufficient autonomous functionality to render the ego vehicle 123 an autonomous vehicle (e.g., a Level III autonomous vehicle or higher as defined by the National Highway Traffic Safety Administration and the Society of Automotive Engineers).

In some embodiments, the notification system 199 includes code and routines that are operable, when executed by the processor 125, to execute one or more steps of the example general method described herein. In some embodiments, the notification system 199 includes code and routines that are operable, when executed by the processor 125, to execute one or more steps of the method 300 described below with reference to FIG. 3. In some embodiments, the notification system 199 includes code and routines that are operable, when executed by the processor 125, to execute one or more steps of the method 600 described below with reference to FIGS. 6A and 6B.

Figure 2:
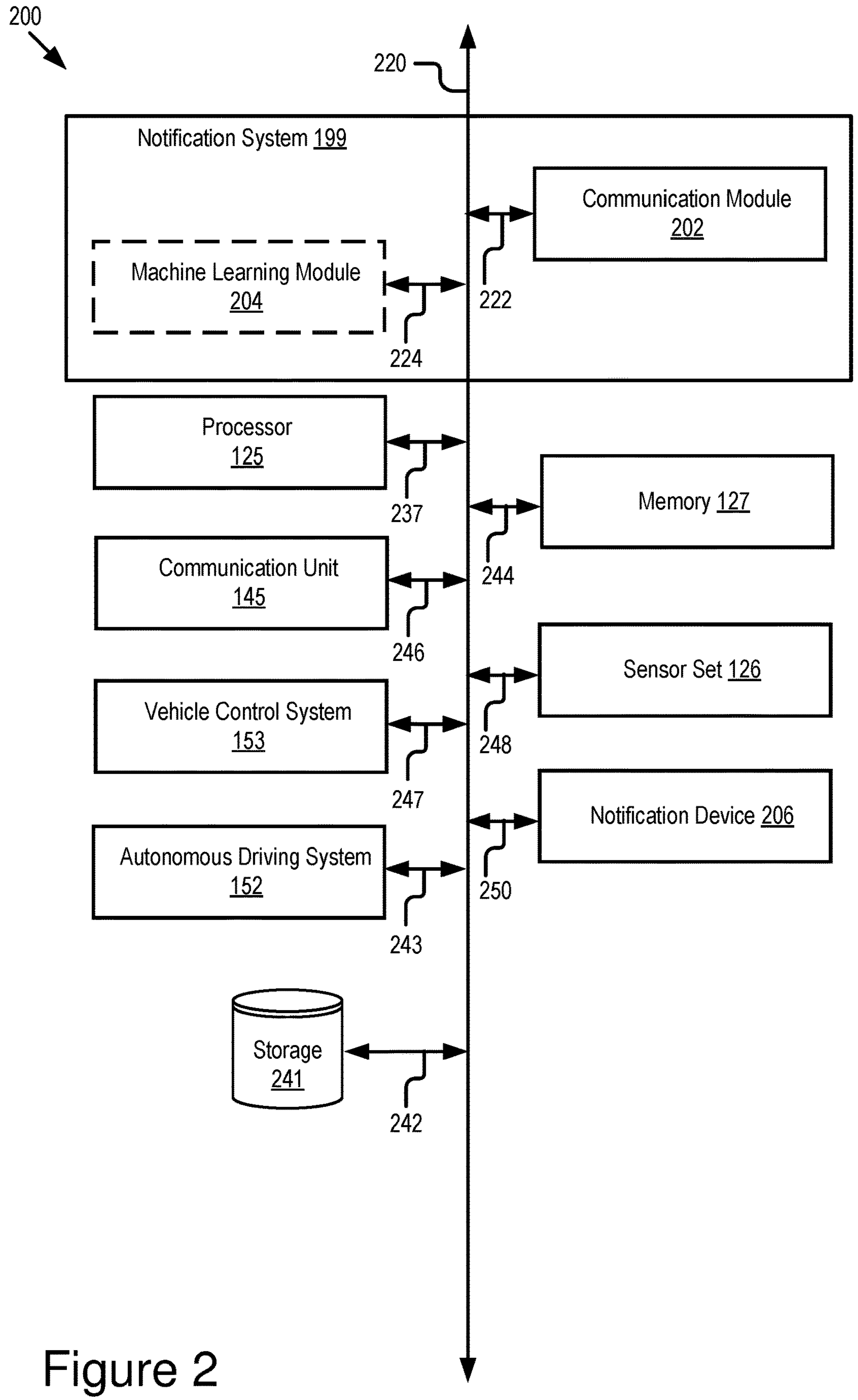
FIG. 2 is a block diagram illustrating an example computer system including a notification system according to some embodiments.

An example embodiment of the notification system 199 is depicted in FIG. 2. This embodiment is described in more detail below.

In some embodiments, the notification system 199 is an element of the onboard unit 139 or some other onboard vehicle computer. In some embodiments, the notification system 199 includes code and routines that are stored in the memory 127 and executed by the processor 125 or the onboard unit 139. In some embodiments, the notification system 199 is an element of an onboard unit of the ego vehicle 123 which executes the notification system 199 and controls the operation of the communication unit 145 of the ego vehicle 123 based at least in part on the output from executing the notification system 199.

In some embodiments, the notification system 199 is implemented using hardware including a field-programmable gate array ("FPGA") or an application-specific integrated circuit ("ASIC"). In some other embodiments, the notification system 199 is implemented using a combination of hardware and software.

The remote vehicle 124 includes elements and functionality which are similar to those described above for the ego vehicle 123, and so, those descriptions will not be repeated here. In some embodiments, one or more of the ego vehicle 123 and the remote vehicle 124 are members of a vehicular micro cloud 194. In some embodiments, the ego vehicle 123 and the remote vehicle 124 are not members of a vehicular micro cloud 194.

The connected roadway infrastructure device 141 includes elements and functionality which are similar to those described above for the ego vehicle 123, and so, those descriptions will not be repeated here. In some embodiments, one or more of the connected roadway infrastructure device 141, ego vehicle 123, and the remote vehicle 124 are members of a vehicular micro cloud 194. These elements may be members of the same or different vehicular micro clouds. In some embodiments, one or more of the connected roadway infrastructure device 141, the ego vehicle 123, and the remote vehicle 124 are not members of a vehicular micro cloud 194.

In some embodiments, the connected roadway infrastructure device 141 includes hardware that enables the connected roadway infrastructure device 141 to modify the flow of traffic in the roadway responsive to an adverse driving condition (e.g., to minimize the effect of the adverse driving condition or obviate the adverse driving condition). For example, the connected roadway infrastructure device 141 is operable to control the operation of a traffic signal, the information depicted on a sign, modify the direction of travel in a lane of traffic; open or close lanes; meter traffic into a roadway; modify the flow of traffic through an intersection; modify the speed of traffic, etc. In some embodiments, the connected roadway infrastructure device 141 includes a roadside unit that includes the hardware that provides the functionality described herein. In some embodiments, the connected roadway infrastructure device 141 includes a roadside unit having a processor and a communication unit that enables the roadside unit to send and receive wireless messages via the network 105 and execute one or more of the steps described herein.

In some embodiments, the connected roadway infrastructure device 141 includes a non-transitory memory (not pictured) that stores digital data such as the system data 129. The system data 129 includes the control data. The control data includes digital data that controls the operation of the connected roadway infrastructure device 141. For example, the control data describes configurable portions of the software that controls the operation of the connected roadway infrastructure device 141. In some embodiments, the control data includes parameters and/or variables of the software that controls the operation of the connected roadway infrastructure device 141. These parameters and/or variables are modifiable by instructions received from a notification system 199. In some embodiments, modification of these parameters and/or variables modifies the operation of the connected roadway infrastructure device 141. In this way, the notification system 199 is operable to modify the operation of the connected roadway infrastructure device 141. In some embodiments, modifying the operation of the connected roadway infrastructure device 141 modifies the operation of roadside equipment such as traffic signals, traffic lights, and any other roadside equipment described herein. In this way, the notification system 199 is operable to control the operation of roadside equipment by modifying the operation of the connected roadway infrastructure device 141 according to some embodiments. This is an optional feature of the notification system 199 and is not required for the notification system 199 to provide its functionality.

The roadway environment 140 is now described according to some embodiments. In some embodiments, one or more of the ego vehicle 123, the remote vehicle 124 (or a plurality of remote vehicles), and the connected roadway infrastructure device 141 are located in a roadway environment 140. In some embodiments, the roadway environment 140 includes one or more vehicular micro clouds 194. The roadway environment 140 is a portion of the real-world that includes a roadway, the ego vehicle 123 and the remote vehicle 124. The roadway environment 140 may include other elements such as roadway signs, environmental conditions, traffic, etc. The roadway environment 140 includes some or all of the tangible and/or measurable qualities described above with reference to the ego sensor data 195 and the remote sensor data 193. The remote sensor data 193 includes digital data that describes the sensor measurements recorded by the sensor set(s) 126 of the remote vehicle(s) 124.

In some embodiments, the real-world includes the reality of human experience comprising physical objects and excludes artificial environments and "virtual" worlds such as computer simulations.

In some embodiments, the roadway environment 140 includes a roadway device (e.g., a roadside unit or some other processor-based computing system) that includes an edge server 198. In some embodiments, the edge server 198 is a connected processor-based computing device that includes an instance of the notification system 199 and the other elements described above with reference to the ego vehicle 123 (e.g., a processor 125, a memory 127 storing the system data 129, a communication unit 145, etc.). In some embodiments, the roadway device is a member of the vehicular micro cloud 194.

In some embodiments, the edge server 198 includes one or more of the following elements: a hardware server; a personal computer; a laptop; a device such as a roadside unit; or any other processor-based connected device that is not a member of the vehicular micro cloud 194 and includes an instance of the notification system 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 1 as being stored by the memory 127.

In some embodiments, the edge server 198 includes a backbone network. In some embodiments, the edge server 198 includes one or more of the following: an instance of the notification system 199; and a non-transitory memory storing system data 129. The functionality of these elements was described above with reference to the ego vehicle 123 and the example general method, and so, those descriptions will not be repeated here.

In some embodiments, the edge server 198 is operable to provide any other functionality described herein. For example, the edge server 198 is operable to execute some or all of the steps of one or more of the methods described herein.

In some embodiments, the cloud server 103 one or more of the following: a hardware server; a personal computer; a laptop; a device such as a roadside unit; or any other processor-based connected device that is not a member of the vehicular micro cloud 194 and includes an instance of the notification system 199 and a non-transitory memory that stores some or all of the digital data that is stored by the memory 127 of the ego vehicle 123 or otherwise described herein.

In some embodiments, the cloud server 103 includes one or more of the following elements: an instance of the notification system 199; and a non-transitory memory storing system data 129. The functionality of these elements was described above with reference to the ego vehicle 123 and the example general method, and so, those descriptions will not be repeated here.

In some embodiments, the cloud server 103 is operable to provide any other functionality described herein. For example, the cloud server 103 is operable to execute some or all of the steps of the methods described herein.

In some embodiments, the vehicular micro cloud 194 is stationary. In other words, in some embodiments the vehicular micro cloud 194 is a "stationary vehicular micro cloud." A stationary vehicular micro cloud is a wireless network system in which a plurality of connected vehicles (such as the ego vehicle 123, the remote vehicle 124, the connected roadway infrastructure device 141, etc.), and optionally devices such as a roadway device, form a cluster of interconnected vehicles that are located at a same geographic region. These connected vehicles (and, optionally, connected devices) are interconnected via C-V2X, Wi-Fi, mmWave, DSRC or some other form of V2X wireless communication. For example, the connected vehicles are interconnected via a V2X network which may be the network 105 or some other wireless network that is only accessed by the members of the vehicular micro cloud 194 and not non-members such as the cloud server 103. Connected vehicles (and devices such as a roadside unit) which are members of the same stationary vehicular micro cloud make their unused computing resources available to the other members of the stationary vehicular micro cloud.

In some embodiments, the vehicular micro cloud 194 is "stationary" because the geographic location of the vehicular micro cloud 194 is static; different vehicles constantly enter and exit the vehicular micro cloud 194 over time. This means that the computing resources available within the vehicular micro cloud 194 is variable based on the traffic patterns for the geographic location at various times of day: increased traffic corresponds to increased computing resources because more vehicles will be eligible to join the vehicular micro cloud 194; and decreased traffic corresponds to decreased computing resources because less vehicles will be eligible to join the vehicular micro cloud 194.

In some embodiments, the V2X network is a non-infrastructure network. A non-infrastructure network is any conventional wireless network that does not include infrastructure such as cellular towers, servers, or server farms. For example, the V2X network specifically does not include a mobile data network including third generation (3G), fourth generation (4G), fifth generation (5G), long-term evolution (LTE), Voice-over-LTE (VOLTE) or any other mobile data network that relies on infrastructure such as cellular towers, hardware servers or server farms.

In some embodiments, the non-infrastructure network includes Bluetooth® communication networks for sending and receiving data including via one or more of DSRC, mmWave, full-duplex wireless communication and any other type of wireless communication that does not include infrastructure elements. The non-infrastructure network may include vehicle-to-vehicle communication such as a Wi-Fi™ network shared among two or more vehicles 123, 124.

In some embodiments, the wireless messages described herein are encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the notification system 199 includes encryption keys for encrypting wireless messages and decrypting the wireless messages described herein.

Referring now to FIG. 2, depicted is a block diagram illustrating an example computer system 200 including a notification system 199 according to some embodiments.

In some embodiments, the computer system 200 may include a special-purpose computer system that is programmed to perform one or more of the following: one or more steps of the method 300 described herein with reference to FIG. 3; one or more steps of the method 600 described herein with reference to FIGS. 6A and 6B; and the example general method described herein.

In some embodiments, the computer system 200 may include a processor-based computing device. For example, the computer system 200 may include an onboard vehicle computer system of one or more of the ego vehicle 123 and the remote vehicle 124.

The computer system 200 may include one or more of the following elements according to some examples: the notification system 199; a processor 125; a communication unit 145; a vehicle control system 153; a storage 241; an autonomous driving system 152; a notification system 199; a notification device 206; the sensor set 126; and a memory 127. The components of the computer system 200 are communicatively coupled by a bus 220.

In some embodiments, the computer system 200 includes additional elements such as those depicted in FIG. 1 as elements of the notification system 199.

In the illustrated embodiment, the processor 125 is communicatively coupled to the bus 220 via a signal line 237. The communication unit 145 is communicatively coupled to the bus 220 via a signal line 246. The vehicle control system 153 is communicatively coupled to the bus 220 via a signal line 247. The storage 241 is communicatively coupled to the bus 220 via a signal line 242. The memory 127 is communicatively coupled to the bus 220 via a signal line 244. The sensor set 126 is communicatively coupled to the bus 220 via a signal line 248. The autonomous driving system 152 is communicatively coupled to the bus 220 via a signal line 243. The notification device 206 is communicatively coupled to the bus 220 via a signal line 250.

In some embodiments, the sensor set 126 includes standard-compliant GPS unit. In some embodiments, the communication unit 145 includes a network sniffer.

The following elements of the computer system 200 were described above with reference to FIG. 1, and so, these descriptions will not be repeated here: the processor 125; the communication unit 145; the vehicle control system 153; the memory 127; the sensor set 126; the autonomous driving system 152; the notification device 206; and the notification system 228.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the notification system 199 includes code and routines that are operable, when executed by the processor 125, to cause the processor 125 to execute one or more steps of the method 300 described herein with reference to FIG. 3. In some embodiments, the notification system 199 includes code and routines that are operable, when executed by the processor 125, to cause the processor 125 to execute one or more steps of the method 600 described herein with reference to FIGS. 6A and 6B. In some embodiments, the notification system 199 includes code and routines that are operable, when executed by the processor 125, to cause the processor 125 to execute one or more steps of the example general method.

In the illustrated embodiment shown in FIG. 2, the notification system 199 includes one or more of the following: a communication module 202; and a machine learning module 204.

The communication module 202 can be software including routines for handling communications between the notification system 199 and other components of the computer system 200. In some embodiments, the communication module 202 can be a set of instructions executable by the processor 125 to provide the functionality described below for handling communications between the notification system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the notification system 199 and stores the data in one or more of the storage 241 and the memory 127.

In some embodiments, the communication module 202 may handle communications between components of the notification system 199 or the computer system 200.

The machine learning module 204 is depicted with a dashed line in FIG. 2 to indicate that it is an optional element of the computer system 200. The machine learning module 204 can be software including routines for executing an analysis of digital data to generate an output. For example, the machine learning module 204 includes an AI module and, when executed by the processor 124, causes the processor 124 to execute an AI analysis of digital data (e.g., sensor data) inputted to the machine learning module 204 to generate digital data describing an output that is generated based on this analysis. In some embodiments, the machine learning module 204 is trained to receive the input and generate the output. Examples of such analysis are described herein, including, for example, the descriptions below for the severity equations depicted in FIG. 8 and above for the determination of the environment data 163, the moment pattern data 161, the analysis data 181, and the pattern data 183. In some embodiments, the communication module 202 provides the inputs to the machine learning module 204 and stores the outputs of the machine learning module 204 in one or more of the memory 127 and the storage 241. In some embodiments, the machine learning module 204 can be stored in the memory 127 of the computer system 200 and can be accessible and executable by the processor 125. The machine learning module 204 may be adapted for cooperation and communication with the processor 125 and other components of the computer system 200 via signal line 224.

Example differences in technical effect between one or more of the example general method, method 300, and method 600 and the prior art are now described below. These examples are illustrative and not exhaustive of the possible differences.

In some embodiments, the notification system 199 suppresses notifications of adverse driving conditions and only provides such notifications when it determines that there is an increasing trend in severity of the adverse driving condition as measured over time. The notification system 199 measures the severity two or more separate times to identify this increasing trend, and in some embodiments requires that the increasing trend satisfy a threshold before providing a notification to the driver about the adverse driving condition. By comparison, the existing solutions always provide notifications when they have identified an adverse driving condition and do not attempt to suppress notifications if there is not an increasing trend in the severity of the adverse driving condition as measured over two or more time periods.

The existing solutions also do not utilize vehicular micro clouds to implement functionality such as that provided by the notification system. The existing solutions also do not use digital twin simulations, AI models, or mathematical models as described herein to provide their functionality.

The existing solutions also do not feedback data to customize notifications to be aligned with the sensitivity of the driver of the ego vehicle, or continuously update the sensitivity data for the driver of the ego vehicle so that the sensitivity data stays up to date (it may change over time as the driver ages or has different abilities or sensibilities).

The existing references also do not describe vehicular micro clouds as described herein. Some of the existing solutions require the use of vehicle platooning. A platoon is not a vehicular micro cloud and does not provide the benefits of a vehicular micro cloud, and some embodiments of the notification system that require a vehicular micro cloud. For example, among various differences between a platoon and a vehicular micro cloud, a platoon does not include a hub or a vehicle that provides the functionality of a hub vehicle. By comparison, in some embodiments the notification system includes codes and routines that are operable, when executed by a processor, to cause the processor to utilize vehicular micro clouds to provide its functionality.

These examples are intended to be illustrative and not limiting.

Referring now to FIG. 3, depicted is a flowchart of an example method 300 according to some embodiments. The method 300 includes step 305, step 310, step 315, and step 320 as depicted in FIG. 3. The steps of the method 300 may be executed in any order, and not necessarily those depicted in FIG. 3. In some embodiments, one or more of the steps are skipped or modified in ways that are described herein or known or otherwise determinable by those having ordinary skill in the art.

Referring now to FIG. 4 depicted is a block diagram of an example use case 400 according to some embodiments. The use case 400 includes a swerve pattern 410 having a period 405 that is calculable by the notification system 199. For example, the notification system 199 includes code and routines that are operable to measure the period 405 based on the sensor data that describe the swerve pattern 410. The period 405 is an example of moment pattern data.

Referring now to FIG. 5 depicted is a block diagram of an example use case 500 according to some embodiments. The use case 500 includes a moment pattern that is calculable from the increasing distance between the ego vehicle 123 and the remote vehicle 124 that is created because the ego vehicle 123 is in motion moving forward as time goes by and the remote vehicle 124 is stationary because it is at a stop sign.

Referring now to FIGS. 6A and 6B, depicted are a flowchart of an example method 600 according to some embodiments. The method 600 includes step 605, step 610, step 615, step 620, and step 625 as depicted in FIG. 6A and step 630, step 635, step 640, step 645, step 650, and step 655 as depicted in FIG. 6B. The steps of the method 600 may be executed in any order, and not necessarily those depicted in FIGS. 6A and 6B. In some embodiments, one or more of the steps are skipped or modified in ways that are described herein or known or otherwise determinable by those having ordinary skill in the art.

Referring now to FIG. 7 depicted is a block diagram of an example use case 700 according to some embodiments.

Depicted in FIG. 8 is a block diagram illustrating a set of severity equations 800 according to some embodiments.

In some embodiments, the first severity equation 805 includes a variable $X_i$ that is computed by the notification system 199 and is an aggregated contribution to the severity score which is contributed by both the characteristics of unsafe driving (e.g., as quantified by the moment pattern data 161) and the characteristics of the surrounding environment of the ego vehicle 123 (as quantified by the environment data 163. In some embodiments, the notification system 199 inputs the sensor data to a module included in the notification system 199 and the module outputs the variable $X_i$. For example, the module includes a machine learning module that is trained to calculate the variable $X_i$ based on sensor data inputted to the machine learning module. In some embodiments, the machine learning module includes a type of deep learning AI model including, for example, a neural network and/or a support vector machine, or any derivative thereof. Other suitable types of AI models are described herein. In some embodiments, the weights $w_i$ are customized to the sensitivity of the driver 109 as determined by the notification system 199 responsive to the feedback data 157 inputted by the driver 109.

An example of the machine learning module according to some embodiments includes the machine learning module 204 depicted in FIG. 2.

In some embodiments, the second severity equation 810 outputs a severity value W describing an adverse driving condition. This severity value W has three components: X, the severity caused by the characteristics of unsafe driving (as accounted for by the moment pattern data 161); Y, the severity caused by the characteristics of the operation of the ego vehicle 123 (as accounted for by one or more of the ego sensor data 195 and the remote sensor data 193); and Z, the severity caused by the characteristics of the surrounding (as accounted for by the environment data 163).

Determination of Z Variable

In some embodiments, the notification system 199 includes code and routines that are operable to execute one or more of the following steps to determine the Z variable: analyze the sensor data and select which portions of the sensor data describe characteristics of the environment surrounding the ego vehicle 123 that contribute to the severity of the adverse driving condition (e.g., the speed of remote vehicles, the heading of the remote vehicles, the geographic location of the remote vehicles, a moment pattern of the remote vehicles, the number of lanes available on the roadway, which of these lanes are blocked by remote vehicles or other obstacles, relevant weather conditions, distance between the ego vehicle and objects in the environment, etc.); input this sensor data into a module included in the notification system 199; and execute this module so that the module outputs the variable Z. For example, the module includes a machine learning module that is trained to calculate the variable Z based on sensor data inputted to the machine learning module. In some embodiments, the machine learning module includes a type of deep learning AI model including, for example, a neural network and/or a support vector machine, or any derivative thereof. Other suitable types of AI models are described herein. In some embodiments, the calculation of the Z variable by the machine learning module is customized to the sensitivity of the driver 109 as determined by the notification system 199 responsive to the feedback data 157 inputted by the driver 109. In this way the notification system 199 outputs severity scores W that are customized for the driver 109 based on their sensitivity as reflected in the feedback they provide.

In some embodiments, the notification system 199 includes code and routines that are operable to execute one or more of the following steps to determine the Z variable: analyze the sensor data for a range of time stamps associated with the occurrence of an adverse driving condition and select which portions of the sensor data describe characteristics of environment surrounding the ego vehicle that contribute to the severity of the adverse driving condition; input this sensor data into a machine learning module included in the notification system 199; execute the machine learning module so that the machine learning module outputs the environment data responsive to this sensor data; input the environment data into the into the machine learning module included in the notification system; input all the sensor data for the range of time stamps associated with the occurrence of the adverse driving condition to the machine learning module; execute the machine learning module using the sensor data and the moment pattern data to output the variable Z.

Determination of the Sensitivity of the Driver of the Ego Vehicle

In some embodiments, the machine learning module of the notification system 199 incudes code and routines that are operable, when executed by a processor, to cause the processor to analyze the feedback data 157 and output digital data that describes the sensitivity of the driver 109 of the ego vehicle. For example, the module includes a machine learning module that is trained to calculate the sensitivity of the driver 109 based on feedback data inputted to the machine learning module. In some embodiments, the machine learning module includes a type of deep learning AI model including, for example, a neural network and/or a support vector machine, or any derivative thereof. Other suitable types of AI models are described herein.

Determination of the X Variable

In some embodiments, the notification system 199 includes code and routines that are operable to execute one or more of the following steps to determine the X variable: analyze the sensor data and select which portions of the sensor data describe moment patterns of remote vehicles that contribute to the severity of the adverse driving condition; input this sensor data into a module included in the notification system 199; and execute this module so that the module outputs the variable X. For example, the module includes a machine learning module that is trained to calculate the variable X based on sensor data inputted to the machine learning module. In some embodiments, the machine learning module includes a type of deep learning AI model including, for example, a neural network and/or a support vector machine, or any derivative thereof. Other suitable types of AI models are described herein. In some embodiments, the calculation of the X variable by the machine learning module is customized to the sensitivity of the driver 109 as determined by the notification system 199 responsive to the feedback data 157 inputted by the driver 109. In this way the notification system 199 outputs severity scores W that are customized for the driver 109 based on their sensitivity as reflected in the feedback they provide.

In some embodiments, the variable X is the moment pattern data outputted by the machine learning module based on analysis of the sensor data inputted to the machine learning module.

In some embodiments, the moment pattern data is inputted to the machine learning module and is a component considered by the machine learning module, along with some or all of the sensor data, when calculating the variable X.

In some embodiments, the notification system 199 includes code and routines that are operable to execute one or more of the following steps to determine the X variable: analyze the sensor data for a range of time stamps associated with the occurrence of an adverse driving condition and select which portions of the sensor data describe characteristics of unsafe driving by remote vehicles (e.g., moment patterns) that contribute to the severity of the adverse driving condition; input this sensor data into a machine learning module included in the notification system 199; execute the machine learning module so that the machine learning module outputs the moment pattern data responsive to this sensor data; input the moment pattern data into the into the machine learning module included in the notification system; input all the sensor data for the range of time stamps associated with the occurrence of the adverse driving condition to the machine learning module; execute the machine learning module using the sensor data and the moment pattern data to output the variable X.

In some embodiments, the machine learning module includes code and routines that are operable, when executed by a processor, to cause the processor to analyze the sensor data inputted to it and determine components of X and then determine the X variable based on an analysis of these components by the notification system 199. For example, the components of X include one or more of the following:

driver type; repetition degree (herein "RD"); and movement pattern. Examples of these components of the X variable are now described.

In some embodiments, the driver type is a value from 1 to 100 with the range of 100 to 80 being designated as an "Aggressive" type of driver, 79 to 70 being a "Reckless" type of driver, 60 to 69 being a distracted type of driver, and 0 to 59 being a "Normal" type of driver. The higher the value for the driver type, the riskier their behavior when determining their severity. In some embodiments, these ranges are modified by the notification system 199 based on the sensitivity of the driver so that the X variable, and ultimately the severity score it contributes to producing, is customized based on the sensitivity of the driver 109 of the ego vehicle.

In some embodiments, the RD is a value that describes the repetition of the driving behavior that results in the moment pattern described by the moment pattern data. The more frequent the moment pattern reoccurs, the riskier the behavior is when determining the severity score. The machine learning module analyzes the sensor data describing the adverse driving condition (as identified based on time stamps) and determines the RD for one or more moment patterns included in the sensor data. In some embodiments, the RD value is calculated as RD value=1/RD.

In some embodiments, the movement pattern is a value that describes the movement pattern of the driving behavior that results in the moment pattern described by the moment pattern data. The higher the value for the movement pattern, the riskier the behavior is when determining the severity score. The machine learning module analyzes the sensor data describing the adverse driving condition (as identified based on time stamps) and determines the movement pattern value for one or more moment patterns included in the sensor data.

In some embodiments, the machine learning module includes code and routines that are operable, when executed by a processor, to cause the processor to analyze the sensor data for a range of time stamps associated with an adverse driving condition and determine the driver type value, RD value, and movement pattern value and then calculate the X variable based these components. For example, the X variable is the summation of each of these values. In some embodiments, weights are assigned to each of these components [e.g., X=(driver type value)($w_1$)+(RD value)($w_2$)+(movement pattern value)($w_3$)]. In some embodiments, the notification system modifies the weights ($w_1$, $w_2$, $w_3$) based on the sensitivity of the driver so that the X variable is customized based on the sensitivity of the driver.

Determination of the Y Variable

In some embodiments, the notification system 199 includes code and routines that are operable to execute one or more of the following steps to determine the Y variable: analyze the sensor data and select which portions of the sensor data describe characteristics of the operation of the ego vehicle 123 that contribute to the severity of the adverse driving condition; input this sensor data into a module included in the notification system 199; and execute this module so that the module outputs the variable Y. For example, the module includes a machine learning module that is trained to calculate the variable Y based on sensor data inputted to the machine learning module. In some embodiments, the machine learning module includes a type of deep learning AI model including, for example, a neural network and/or a support vector machine, or any derivative thereof. Other suitable types of AI models are described herein. In some embodiments, the calculation of the Y variable by the machine learning module is customized to the sensitivity of the driver 109 as determined by the notification system 199 responsive to the feedback data 157 inputted by the driver 109. In this way the notification system 199 outputs severity scores W that are customized for the driver 109 based on their sensitivity as reflected in the feedback they provide.

In some embodiments, the notification system 199 includes code and routines that are operable to execute one or more of the following steps to determine the Y variable: analyze the sensor data for a range of time stamps associated with the occurrence of an adverse driving condition and select which portions of the sensor data describe characteristics of driving by the ego vehicle that contribute to the severity of the adverse driving condition; input this sensor data into a machine learning module included in the notification system 199; execute the machine learning module using the sensor data to output the variable Y.

In some embodiments, the notification system 199 includes code and routines that are operable to execute one or more of the following steps to determine the Y variable: analyze the sensor data for a range of time stamps associated with the occurrence of an adverse driving condition and select which portions of the sensor data describe characteristics of driving by the ego vehicle that contribute to the severity of the adverse driving condition (e.g., the speed of the ego vehicle 123, the heading of the ego vehicle 123, the geographic location of the ego vehicle 123, a moment pattern of the ego vehicle 123, etc.); input this sensor data into the machine learning module included in the notification system 199; and execute the machine learning module using this sensor data as an input so that the machine learning module outputs the variable Y. For example, the machine learning module is trained to calculate the variable Y based on sensor data inputted to the machine learning module.

In some embodiments, the machine learning module includes code and routines that are operable, when executed by a processor, to cause the processor to analyze the sensor data inputted to it and determine components of Y and then determine the Y variable based on an analysis of these components by the notification system 199. For example, the components of Y include one or more of the following: the next action of the ego vehicle; the relative position of the ego vehicle to other vehicles; and the type of vehicle driving ahead of the ego vehicle (in any lane). Examples of these components of the Y variable are now described.

In some embodiments, the next action of the ego vehicle is a value from 1 to 100 with the range of 100 to 80 being designated as an "lane change" type of next action, 79 to 70 being designated as a "speed up" type of next action, 60 to 69 being designated as a "slow down" type of next action, and 0 to 59 being designated as any type of action that obviates the risk posed by the adverse driving condition. The higher the score for the next action of the ego vehicle, the riskier this behavior is when determining severity. In some embodiments, these ranges are modified by the notification system 199 based on the sensitivity of the driver so that the Y variable, and ultimately the severity score it contributes to producing, is customized based on the sensitivity of the driver 109 of the ego vehicle.

In some embodiments, the "the relative position of the ego vehicle to other vehicles" is a value that describes a risk caused by the relative position of the ego vehicle to other vehicles. In some embodiments, the notification system determines the "the relative position of the ego vehicle to other vehicles" value by executing one or more pattern matching algorithms which are seeded with sensor data for the range of times when the adverse driving condition is occurring to generate digital data that describes a movement pattern match of the vehicles described by the sensor data along with the position of the ego vehicle relative to other vehicles. The more dangerous the movement pattern match is, the higher the value.

In some embodiments, the notification system determines the "the relative position of the ego vehicle to other vehicles" value by inputting sensor data for the time range associated with the adverse driving condition to the machine learning module and executing the machine learning module to generate an output that describes the "the relative position of the ego vehicle to other vehicles" value. The machine learning module is trained with historical driving data to identify such patterns and output this value based on sensor data inputted to the machine learning module. Higher values are associated with higher risk.

In some embodiments, the "type of vehicle driving ahead of the ego vehicle" is a value that describes a risk caused by the type of vehicle traveling ahead of the ego vehicle. Certain types of vehicle are assumed to be riskier than others. The notification system includes object priors or other data that are used in combination with sensor data from front-facing cameras to determine the type of vehicle traveling ahead of the ego vehicle. Example values include the following: semi-trucks (100), light duty trucks (80); passenger cars (70); motorcycle (100); and bicycles (100). Higher values are associated with higher risk. In some embodiments, these values are modified by the notification system based on the sensitivity of the driver so that the Y variable is customized based on the sensitivity of the driver.

In some embodiments, the severity score W is the sum of X, Y, and Z. The higher the value is for W, the riskier the situation is determined to be by the notification system. The notification system calculates a value for W for the same adverse condition at a plurality of times in order to determine whether an increasing trend is present in the value for W. In some embodiments, the notification system only notifies the driver about the adverse condition if an increasing trend is present.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A notification system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the notification system to become coupled to other notification systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising: detecting, based on one or more first sensor measurements recorded by a sensor set of an ego vehicle, a presence of an adverse driving condition caused by a remote vehicle;

determining a first severity of the adverse driving condition based at least in part on the one or more first sensor measurements;

determining a second severity of the adverse driving condition based at least in part on one or mor second sensor measurements;

and providing, by the ego vehicle, a notification of the adverse driving condition caused by the remote vehicle responsive to the second severity increasing relative to the first severity so that an increasing severity trend is present; wherein the notification is not provided if the increasing severity trend is not present.

2. The method of claim 1, wherein the presence of the adverse driving condition is detected based at least in part on inputting the first sensor measurements into a transformer-based artificial intelligence (AI) model and executing the transformer-based AI model by a processor to generate analysis data describing the presence of an adverse driving condition caused by a remote vehicle.

3. The method of claim 1, wherein the first sensor measurements and the second sensor measurements include moment pattern data describing a moment pattern caused by an operation of the remote vehicle.

4. The method of claim 3, wherein the moment pattern describes a period of a space between the remote vehicle and an ego vehicle when the remote vehicle is stopped behind the ego vehicle.

5. The method of claim 3, wherein the moment pattern describes a period of a swerve caused by the remote vehicle swerving.

6. The method of claim 3, wherein the moment pattern changes over time between a first time when the one or more first sensor measurements are recorded and a second time when the one or more second sensor measurements are recorded.

7. The method of claim 1, wherein the first severity and the second severity are determined by a processor executing a severity equation that is customized based on a sensitivity of a driver of an ego vehicle.

8. The method of claim 1, wherein the first severity and the second severity are determined by a processor executing a selected severity equation that is selected from a plurality of severity equations.

9. The method of claim 8, wherein the selected severity equation is selected from the plurality based on the selected severity equation outputting severity calculations that are most aligned with a sensitivity of a driver of an ego vehicle relative to the severity calculations outputted by non-selected equations included in the plurality.

10. The method of claim 9, wherein a determination that the selected severity equation is most aligned with the sensitivity of the driver is based on feedback received from the driver.

11. A system comprising: a non-transitory memory; and a processor communicatively coupled to the non-transitory memory, wherein the non-transitory memory stores computer readable code that is operable, when executed by the processor, to cause the processor to execute steps including:

detecting, based on one or more first sensor measurements recorded by a sensor set of an ego vehicle, a presence of an adverse driving condition caused by a remote vehicle; determining a first severity of the adverse driving condition based at least in part on the one or more first sensor measurements;

determining a second severity of the adverse driving condition based at least in part on one or more second sensor measurements; and providing, by the ego vehicle, a notification of the adverse driving condition caused by the remote vehicle responsive to the second severity increasing relative to the first severity so that an increasing severity trend is present; wherein the notification is not provided if the increasing severity trend is not present.

12. The system of claim 11, wherein the presence of the adverse driving condition is detected based at least in part on inputting the first sensor measurements into a transformer-based artificial intelligence (AI) model and executing the transformer-based AI model by a processor to generate analysis data describing the presence of an adverse driving condition caused by a remote vehicle.

13. The system of claim 11, wherein the first sensor measurements and the second sensor measurements include moment pattern data describing a moment pattern caused by an operation of the remote vehicle.

14. The system of claim 13, wherein the moment pattern describes a period of a space between the remote vehicle and an ego vehicle when the remote vehicle is stopped behind the ego vehicle.

15. The system of claim 13, wherein the moment pattern describes a period of a swerve caused by the remote vehicle swerving.

16. The system of claim 13, wherein the moment pattern changes over time between a first time when the one or more first sensor measurements are recorded and a second time when the one or more second sensor measurements are recorded.

17. The system of claim 11, wherein not providing the notification if the increasing severity trend is not present reduces false positive notifications of adverse driving conditions that are not threats to the driver sufficient to satisfy a threshold for severity.

18. A computer program product including computer code stored on a non-transitory memory that is operable, when executed by a processor, to cause the processor to execute operations including: detecting, based on one or more first sensor measurements recorded by a sensor set of an ego vehicle, a presence of an adverse driving condition caused by a remote vehicle;

determining a first severity of the adverse driving condition based at least in part on the one or more first sensor measurements; determining a second severity of the adverse driving condition based at least in part on one or more second sensor measurements; and providing, by the ego vehicle, a notification of the adverse driving condition caused by the remote vehicle responsive to the second severity increasing relative to the first severity so that an increasing severity trend is present; wherein the notification is not provided if the increasing severity trend is not present.

19. The computer program product of claim 18, wherein the first sensor measurements and the second sensor measurements include moment pattern data describing a moment pattern caused by an operation of the remote vehicle.

20. The computer program product of claim 18, wherein not providing the notification if the increasing severity trend is not present reduces false positive notifications of adverse driving conditions that are not threats to the driver sufficient to satisfy a threshold for severity.

* * * * *